United States Patent
Sanghi et al.

(10) Patent No.: US 10,684,670 B2
(45) Date of Patent: Jun. 16, 2020

(54) METHODS AND APPARATUS FOR MANAGING POWER WITH AN INTER-PROCESSOR COMMUNICATION LINK BETWEEN INDEPENDENTLY OPERABLE PROCESSORS

(71) Applicant: Apple Inc., Cupertino, CA (US)

(72) Inventors: Karan Sanghi, San Jose, CA (US); Saurabh Garg, San Jose, CA (US); Haining Zhang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/390,998

(22) Filed: Apr. 22, 2019

(65) Prior Publication Data

US 2019/0317591 A1 Oct. 17, 2019

Related U.S. Application Data

(62) Division of application No. 15/942,230, filed on Mar. 30, 2018, now Pat. No. 10,268,261, which is a
(Continued)

(51) Int. Cl.
*G06F 9/00* (2006.01)
*G06F 1/3293* (2019.01)
(Continued)

(52) U.S. Cl.
CPC .......... *G06F 1/3293* (2013.01); *G06F 1/3228* (2013.01); *G06F 1/3243* (2013.01);
(Continued)

(58) Field of Classification Search
CPC ....................................................... G06F 1/32
See application file for complete search history.

(56) References Cited

U.S. PATENT DOCUMENTS

| | | | |
|---|---|---|---|
| 4,805,137 A | 2/1989 | Grant et al. | |
| 4,949,299 A | 8/1990 | Pickett | |

(Continued)

FOREIGN PATENT DOCUMENTS

| | | | |
|---|---|---|---|
| EP | 3013008 A1 | 4/2016 | |
| JP | H02306082 A | 12/1990 | |

(Continued)

OTHER PUBLICATIONS

ECN L1 PM Substates with CLKREQ approved Aug. 23, 2012.
(Continued)

*Primary Examiner* — Cheng Yuan Tseng
(74) *Attorney, Agent, or Firm* — Gazdzinski & Associates, PC

(57) ABSTRACT

Methods and apparatus for an inter-processor communication (IPC) link between two (or more) independently operable processors. In one aspect, the IPC protocol is based on a "shared" memory interface for run-time processing (i.e., the independently operable processors each share (either virtually or physically) a common memory interface). In another aspect, the IPC communication link is configured to support a host driven boot protocol used during a boot sequence to establish a basic communication path between the peripheral and the host processors. Various other embodiments described herein include sleep procedures (as defined separately for the host and peripheral processors), and error handling.

23 Claims, 25 Drawing Sheets

Related U.S. Application Data division of application No. 14/879,027, filed on Oct. 8, 2015, now Pat. No. 9,971,397.

(60) Provisional application No. 62/061,605, filed on Oct. 8, 2014.

(51) Int. Cl.
  *G06F 1/3287* (2019.01)
  *G06F 13/42* (2006.01)
  *G06F 9/4401* (2018.01)
  *G06F 1/3228* (2019.01)
  *G06F 1/3234* (2019.01)
  *G06F 11/14* (2006.01)

(52) U.S. Cl.
  CPC .......... *G06F 1/3287* (2013.01); *G06F 9/4403* (2013.01); *G06F 9/4405* (2013.01); *G06F 9/4411* (2013.01); *G06F 11/1471* (2013.01); *G06F 13/4282* (2013.01); *G06F 11/1417* (2013.01); *G06F 11/1474* (2013.01); *G06F 2201/805* (2013.01); *G06F 2201/87* (2013.01); *Y02D 10/122* (2018.01); *Y02D 10/14* (2018.01); *Y02D 10/151* (2018.01); *Y02D 10/152* (2018.01); *Y02D 10/171* (2018.01)

(56) References Cited

U.S. PATENT DOCUMENTS

| | | | |
|---|---|---|---|
| 4,987,529 A | 1/1991 | Craft et al. | |
| 5,367,688 A | 11/1994 | Croll | |
| 5,467,459 A | 11/1995 | Alexander et al. | |
| 5,485,578 A | 1/1996 | Sweazey | |
| 5,613,086 A | 3/1997 | Frey et al. | |
| 5,659,542 A | 8/1997 | Bell et al. | |
| 5,708,779 A | 1/1998 | Graziano et al. | |
| 5,731,973 A | 3/1998 | Takaishi et al. | |
| 5,850,395 A | 12/1998 | Hauser et al. | |
| 5,903,564 A | 5/1999 | Ganmukhi et al. | |
| 5,943,507 A | 8/1999 | Cornish et al. | |
| 6,008,992 A | 12/1999 | Kawakami | |
| 6,216,178 B1 | 4/2001 | Stracovsky et al. | |
| 6,233,702 B1 | 5/2001 | Bunton et al. | |
| 6,260,152 B1 | 7/2001 | Cole et al. | |
| 6,359,863 B1 | 3/2002 | Varma et al. | |
| 6,411,997 B1 | 6/2002 | Dawes et al. | |
| 6,434,633 B1 | 8/2002 | Braun et al. | |
| 6,485,081 B1 | 11/2002 | Bingle et al. | |
| 6,523,073 B1 | 2/2003 | Kammer et al. | |
| 6,553,446 B1 | 4/2003 | Miller | |
| 6,693,895 B1 | 2/2004 | Crummey et al. | |
| 6,735,642 B2 | 5/2004 | Kagan et al. | |
| 6,815,873 B2 | 11/2004 | Johnson et al. | |
| 6,947,442 B1 | 9/2005 | Sato et al. | |
| 6,948,094 B2 | 9/2005 | Schultz et al. | |
| 6,973,701 B2 | 12/2005 | Momoda et al. | |
| 6,990,594 B2 | 1/2006 | Kim et al. | |
| 7,013,536 B2 | 3/2006 | Golden et al. | |
| 7,032,282 B2 | 4/2006 | Powell et al. | |
| 7,100,020 B1 | 8/2006 | Brightman et al. | |
| 7,127,600 B2 | 10/2006 | Zimmer et al. | |
| 7,191,240 B1 | 3/2007 | Johnson | |
| 7,281,172 B2 | 10/2007 | Chujo | |
| 7,397,774 B1 | 7/2008 | Holland et al. | |
| 7,398,382 B2 | 7/2008 | Rothman et al. | |
| 7,506,084 B2 | 3/2009 | Moerti et al. | |
| 7,509,391 B1 | 3/2009 | Chauvel et al. | |
| 7,587,575 B2 | 9/2009 | Moertl et al. | |
| 7,590,817 B2 | 9/2009 | Moertl et al. | |
| 7,617,377 B2 | 11/2009 | Moertl et al. | |
| 7,681,012 B2 | 3/2010 | Verm et al. | |
| 7,685,476 B2 | 3/2010 | Andre et al. | |
| 7,802,256 B2 | 9/2010 | Havens et al. | |
| 7,853,731 B1 | 12/2010 | Zeng | |
| 7,899,941 B2 | 3/2011 | Hendry et al. | |
| 7,908,335 B1 | 3/2011 | Citterelle et al. | |
| 7,941,682 B2 | 5/2011 | Adams | |
| 8,230,248 B2 * | 7/2012 | Dance .................. | G06F 1/3228 |
| | | | 713/323 |
| 8,255,725 B2 | 8/2012 | Shimazaki et al. | |
| 8,352,624 B2 | 1/2013 | Zimmerman et al. | |
| 8,422,404 B2 | 4/2013 | Taki | |
| 8,468,285 B2 | 6/2013 | Kobayashi | |
| 8,555,099 B2 * | 10/2013 | Marinkovic .......... | G06F 1/3203 |
| | | | 345/502 |
| 8,635,412 B1 | 1/2014 | Wilshire | |
| 8,656,228 B2 | 2/2014 | Check et al. | |
| 8,769,168 B2 | 7/2014 | Moertl et al. | |
| 8,788,822 B1 | 7/2014 | Riddle | |
| 8,799,537 B1 | 8/2014 | Zhu et al. | |
| 8,808,091 B2 | 8/2014 | Shaw et al. | |
| 8,819,386 B1 | 8/2014 | Mather | |
| 8,832,331 B2 | 9/2014 | Co | |
| 8,848,809 B2 | 9/2014 | Whitby-Strevens | |
| 8,876,062 B1 | 11/2014 | Baghdasarian | |
| 8,914,649 B2 | 12/2014 | So et al. | |
| 9,152,580 B1 | 10/2015 | Chau et al. | |
| 9,170,957 B2 | 10/2015 | Touzni et al. | |
| 9,280,360 B2 | 3/2016 | Xu et al. | |
| 9,319,090 B2 | 4/2016 | Whitby-Strevens | |
| 9,544,069 B2 | 1/2017 | Whitby-Strevens et al. | |
| 9,547,535 B1 | 1/2017 | Wilt | |
| 9,568,970 B1 | 2/2017 | Kaushal et al. | |
| 9,582,448 B2 | 2/2017 | Saitou | |
| 9,594,718 B2 | 3/2017 | Kaushik et al. | |
| 9,762,482 B2 | 9/2017 | Sukumar et al. | |
| 9,769,756 B1 | 9/2017 | Cui et al. | |
| 9,830,289 B2 | 11/2017 | Pulyala et al. | |
| 9,910,475 B2 | 3/2018 | Kurts et al. | |
| 9,913,305 B2 | 3/2018 | Pinheiro et al. | |
| 9,932,757 B2 | 4/2018 | Hager et al. | |
| 9,959,124 B1 * | 5/2018 | Herbeck ............... | G06F 9/4401 |
| 10,078,361 B2 | 9/2018 | Sanghi et al. | |
| 2002/0013868 A1 | 1/2002 | West | |
| 2002/0044553 A1 | 4/2002 | Chakravorty | |
| 2002/0065867 A1 | 5/2002 | Chauvel | |
| 2002/0169938 A1 | 11/2002 | Scott et al. | |
| 2002/0195177 A1 | 12/2002 | Hinkley et al. | |
| 2003/0014607 A1 | 1/2003 | Slavin et al. | |
| 2003/0086122 A1 | 5/2003 | Parry | |
| 2003/0200413 A1 | 10/2003 | Gurumoorthy et al. | |
| 2004/0044929 A1 | 3/2004 | Chujo | |
| 2004/0064589 A1 | 4/2004 | Boucher et al. | |
| 2004/0128568 A1 | 7/2004 | O'Shea | |
| 2004/0179546 A1 | 9/2004 | McDaniel et al. | |
| 2004/0201749 A1 | 10/2004 | Malloy Desormeaux | |
| 2004/0221056 A1 | 11/2004 | Kobayashi | |
| 2004/0228365 A1 | 11/2004 | Kobayashi | |
| 2005/0076196 A1 | 4/2005 | Zimmer et al. | |
| 2005/0108385 A1 | 5/2005 | Wechter et al. | |
| 2005/0114620 A1 | 5/2005 | Justen | |
| 2005/0117601 A1 | 6/2005 | Anderson et al. | |
| 2005/0149711 A1 | 7/2005 | Zimmer et al. | |
| 2005/0157781 A1 | 7/2005 | Ho et al. | |
| 2005/0198777 A1 | 9/2005 | Mabe | |
| 2005/0285862 A1 | 12/2005 | Noda et al. | |
| 2006/0039285 A1 | 2/2006 | Chapman et al. | |
| 2006/0047989 A1 | 3/2006 | Delgado et al. | |
| 2006/0107071 A1 | 5/2006 | Girish et al. | |
| 2006/0186700 A1 | 8/2006 | Browne et al. | |
| 2006/0186706 A1 | 8/2006 | Browne et al. | |
| 2006/0218301 A1 | 9/2006 | O'Toole et al. | |
| 2006/0232051 A1 | 10/2006 | Morris et al. | |
| 2007/0005869 A1 | 1/2007 | Balraj et al. | |
| 2007/0043901 A1 | 2/2007 | Wu et al. | |
| 2007/0063540 A1 | 3/2007 | Browne et al. | |
| 2007/0063541 A1 | 3/2007 | Browne et al. | |
| 2007/0070997 A1 | 3/2007 | Weitz et al. | |
| 2007/0080013 A1 | 4/2007 | Melz et al. | |
| 2007/0118831 A1 | 5/2007 | Kondo | |
| 2007/0180041 A1 | 8/2007 | Suzuoki | |
| 2007/0201492 A1 | 8/2007 | Kobayashi | |
| 2007/0226417 A1 | 9/2007 | Davis | |

(56) References Cited

U.S. PATENT DOCUMENTS

| | | |
|---|---|---|
| 2007/0261307 A1 | 11/2007 | Alexander et al. |
| 2007/0286246 A1 | 12/2007 | Kobayashi et al. |
| 2008/0007081 A1 | 1/2008 | Shibata et al. |
| 2008/0010563 A1 | 1/2008 | Nishimura |
| 2008/0046689 A1 | 2/2008 | Chen et al. |
| 2008/0077816 A1 | 3/2008 | Ravichandran |
| 2008/0100079 A1 | 5/2008 | Herrera et al. |
| 2008/0100092 A1 | 5/2008 | Gao et al. |
| 2008/0120911 A1 | 5/2008 | Browne et al. |
| 2008/0183931 A1 | 7/2008 | Verm et al. |
| 2008/0231711 A1 | 9/2008 | Glen et al. |
| 2008/0235355 A1 | 9/2008 | Spanier et al. |
| 2008/0244259 A1 | 10/2008 | Zimmer et al. |
| 2008/0301148 A1 | 12/2008 | Lee et al. |
| 2009/0024924 A1 | 1/2009 | Kim |
| 2009/0113141 A1 | 4/2009 | Bullman et al. |
| 2009/0133016 A1 | 5/2009 | Brown et al. |
| 2009/0138650 A1 | 5/2009 | Lin et al. |
| 2009/0177847 A1 | 7/2009 | Ceze et al. |
| 2009/0189442 A1 | 7/2009 | Chi |
| 2009/0225818 A1 | 9/2009 | Dapper et al. |
| 2009/0282050 A1 | 11/2009 | Thomas et al. |
| 2009/0282088 A1 | 11/2009 | Thomas et al. |
| 2009/0322531 A1 | 12/2009 | Estevez et al. |
| 2010/0017655 A1 | 1/2010 | Gooding et al. |
| 2010/0030932 A1 | 2/2010 | Ergas et al. |
| 2010/0082859 A1 | 4/2010 | Hendry et al. |
| 2010/0098419 A1 | 4/2010 | Levy et al. |
| 2010/0329319 A1 | 12/2010 | Dai et al. |
| 2011/0022859 A1 | 1/2011 | More et al. |
| 2011/0029696 A1 | 2/2011 | Uehara |
| 2011/0035575 A1 | 2/2011 | Kwon et al. |
| 2011/0052142 A1 | 3/2011 | Sultenfuss et al. |
| 2011/0083002 A1 | 4/2011 | Albers et al. |
| 2011/0219208 A1 | 9/2011 | Asaad et al. |
| 2011/0242425 A1 | 10/2011 | Zeng |
| 2011/0248865 A1 | 10/2011 | Hong et al. |
| 2011/0257983 A1 | 10/2011 | Rathonyi et al. |
| 2011/0276710 A1 | 11/2011 | Mighani et al. |
| 2011/0283031 A1 | 11/2011 | Lee |
| 2011/0310296 A1 | 12/2011 | Lee et al. |
| 2011/0320861 A1 | 12/2011 | Bayer et al. |
| 2012/0017063 A1 | 1/2012 | Hummel et al. |
| 2012/0072658 A1 | 3/2012 | Hashimoto et al. |
| 2012/0084483 A1 | 4/2012 | Sanjive |
| 2012/0084484 A1 | 4/2012 | Post et al. |
| 2012/0102307 A1 | 4/2012 | Wong |
| 2012/0124252 A1 | 5/2012 | Kayama et al. |
| 2012/0159513 A1 | 6/2012 | Pakhunov et al. |
| 2012/0224640 A1 | 9/2012 | Sole Rojals et al. |
| 2012/0229076 A1 | 9/2012 | Zhu et al. |
| 2012/0306553 A1 | 12/2012 | Kim et al. |
| 2013/0050216 A1 | 2/2013 | Whitby-Strevens et al. |
| 2013/0057567 A1 | 3/2013 | Frank et al. |
| 2013/0091772 A1 | 4/2013 | Berger et al. |
| 2013/0124895 A1 | 5/2013 | Saha et al. |
| 2013/0138840 A1 | 5/2013 | Kegel et al. |
| 2013/0162911 A1 | 6/2013 | Glen |
| 2013/0290947 A1 | 10/2013 | Li |
| 2014/0033220 A1 | 1/2014 | Campbell et al. |
| 2014/0052976 A1 | 2/2014 | Marino et al. |
| 2014/0082242 A1 | 3/2014 | Murphy et al. |
| 2014/0101468 A1 | 4/2014 | Narayanan et al. |
| 2014/0122828 A1 | 5/2014 | Kagan et al. |
| 2014/0173236 A1 | 6/2014 | Kegel |
| 2014/0189057 A1 | 7/2014 | Sankoda et al. |
| 2014/0189392 A1 | 7/2014 | Bodio et al. |
| 2014/0211894 A1 | 7/2014 | Yang et al. |
| 2014/0215236 A1 | 7/2014 | Heinrich et al. |
| 2014/0244866 A1 | 8/2014 | Manula et al. |
| 2014/0247983 A1 | 9/2014 | Macinnis et al. |
| 2015/0036051 A1 | 2/2015 | Broberg et al. |
| 2015/0189109 A1 | 7/2015 | Whitby-Strevens |
| 2015/0205749 A1 | 7/2015 | Whitby-Strevens et al. |
| 2015/0212806 A1 | 7/2015 | Hsieh |
| 2015/0271265 A1 | 9/2015 | Kobayashi et al. |
| 2015/0293873 A1 | 10/2015 | Shao et al. |
| 2015/0293875 A1 | 10/2015 | Sala et al. |
| 2015/0309650 A1 | 10/2015 | Ahmed et al. |
| 2015/0309940 A1 | 10/2015 | Kumar et al. |
| 2015/0378737 A1 | 12/2015 | Debbage et al. |
| 2016/0034195 A1 | 2/2016 | Li et al. |
| 2016/0041852 A1 | 2/2016 | Suarez Gracia et al. |
| 2016/0077989 A1 | 3/2016 | Pulyala et al. |
| 2016/0091959 A1 | 3/2016 | Barak et al. |
| 2016/0103480 A1 | 4/2016 | Sanghi et al. |
| 2016/0103689 A1 | 4/2016 | Sanghi et al. |
| 2016/0103743 A1 | 4/2016 | Sanghi et al. |
| 2016/0142988 A1 | 5/2016 | Powell et al. |
| 2016/0179157 A1 | 6/2016 | Ardanaz et al. |
| 2016/0208539 A1 | 7/2016 | Hofmann et al. |
| 2016/0224097 A1 | 8/2016 | Hirouchi |
| 2016/0224442 A1 | 8/2016 | Sanghi et al. |
| 2016/0269991 A1 | 9/2016 | Van Greunen et al. |
| 2016/0299860 A1 | 10/2016 | Harriman |
| 2016/0363955 A1 | 12/2016 | Stevens et al. |
| 2016/0364350 A1 | 12/2016 | Sanghi et al. |
| 2017/0026975 A1 | 1/2017 | Maric et al. |
| 2017/0089641 A1 | 3/2017 | Humfeld et al. |
| 2017/0108912 A1 | 4/2017 | Li et al. |
| 2017/0177222 A1 | 6/2017 | Singh et al. |
| 2017/0228481 A1 | 8/2017 | Pusuluri et al. |
| 2017/0249098 A1 | 8/2017 | Petkov et al. |
| 2017/0249164 A1 | 8/2017 | Petkov et al. |
| 2017/0269675 A1 | 9/2017 | Klacar et al. |
| 2017/0286300 A1 | 10/2017 | Doshi et al. |
| 2017/0286322 A1 | 10/2017 | Garg et al. |
| 2017/0286323 A1 | 10/2017 | Garg et al. |
| 2018/0074572 A1 | 3/2018 | Bauman et al. |
| 2018/0101498 A1 | 4/2018 | Cosby et al. |
| 2018/0129261 A1 | 5/2018 | Garg et al. |
| 2018/0129269 A1 | 5/2018 | Garg et al. |
| 2018/0129270 A1 | 5/2018 | Garg et al. |
| 2018/0160155 A1 | 6/2018 | Iguchi et al. |
| 2018/0162770 A1 | 6/2018 | Hawtof et al. |
| 2018/0225251 A1 | 8/2018 | Sthoeger et al. |
| 2018/0367460 A1 | 12/2018 | Gao et al. |
| 2019/0073011 A1 | 3/2019 | Paterson et al. |

FOREIGN PATENT DOCUMENTS

| | | |
|---|---|---|
| JP | H03169996 A | 7/1991 |
| JP | 2004086792 A | 3/2004 |
| JP | 2012086677 A | 6/2012 |
| JP | 2013246642 A | 12/2013 |
| JP | 2015001867 A | 1/2015 |
| WO | WO-2008070138 A2 | 6/2008 |

OTHER PUBLICATIONS

Jackson, "PCI Express Technology", Sep. 2012 (Sep. 2012), MindShare Press, XP002777351, pp. 49,86,87,712-723.
PCI Express base Specification Revision 3.0, published Nov. 10, 2010.
PCI Express Base Specification Revision 3.1, published Oct. 8, 2014.
Universal Serial Bus, Communication Class, Subclass Specifications for Network Control Model (NCM) Devices; Revision 1.0 (Errata 1), Nov. 24, 2010, published by USB Implementers Forum, Inc.
PCI Express Base Specification Revision 4.0 dated Oct. 5, 2017.

\* cited by examiner

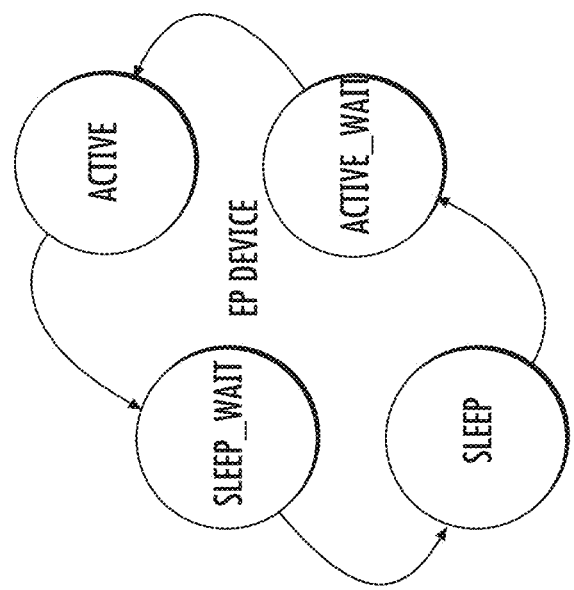
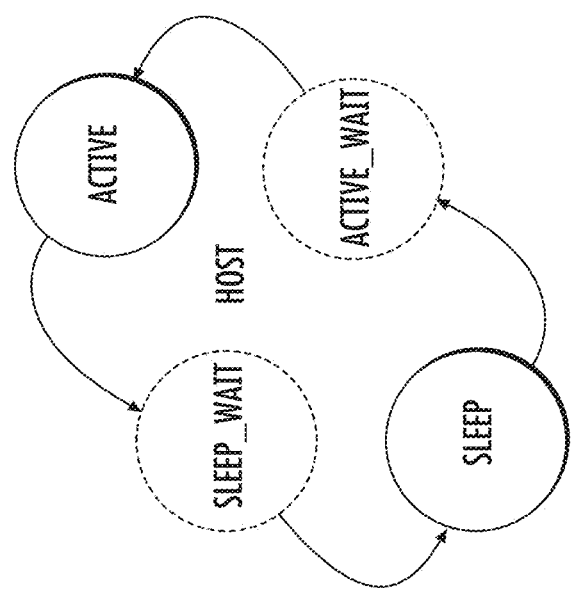
FIG. 14

METHODS AND APPARATUS FOR MANAGING POWER WITH AN INTER-PROCESSOR COMMUNICATION LINK BETWEEN INDEPENDENTLY OPERABLE PROCESSORS

PRIORITY AND RELATED APPLICATIONS

This application is a divisional of and claims the benefit of priority to U.S. patent application Ser. No. 15/942,230 of the same title filed Mar. 30, 2018, which is a divisional of and claims the benefit of priority to co-owned U.S. patent application Ser. No. 14/879,027 of the same title filed Oct. 8, 2015, issued as U.S. Pat. No. 9,971,397 on May 15, 2018, which claims the benefit of priority to U.S. Provisional Patent Application Ser. No. 62/061,605 filed Oct. 8, 2014 and entitled "METHODS AND APPARATUS FOR AN INTER-PROCESSOR COMMUNICATION LINK BETWEEN INDEPENDENTLY OPERABLE PROCESSORS", incorporated herein by reference in its entirety.

This application is also related to commonly owned and co-pending U.S. patent application Ser. No. 14/879,024 entitled "METHODS AND APPARATUS FOR RUNNING AND BOOTING AN INTER-PROCESSOR COMMUNICATION LINK BETWEEN INDEPENDENTLY OPERABLE PROCESSORS", filed Oct. 8, 2015, Ser. No. 14/879,030 entitled "METHODS AND APPARATUS FOR RECOVERING ERRORS WITH AN INTER-PROCESSOR COMMUNICATION LINK BETWEEN INDEPENDENTLY OPERABLE PROCESSORS", filed Oct. 8, 2015, Ser. No. 14/856,283 entitled "METHODS AND APPARATUS FOR AGGREGATING PACKET TRANSFER OVER A VIRTUAL BUS INTERFACE", filed Sep. 16, 2015, and Ser. No. 14/870,923 entitled "METHODS AND APPARATUS FOR CONTROLLED RECOVERY OF ERROR INFORMATION BETWEEN INDEPENDENTLY OPERABLE PROCESSORS" filed Sep. 30, 2015, and commonly owned U.S. Provisional Patent Application Ser. No. 62/175,174 entitled "METHODS AND APPARATUS FOR SYNCHRONIZING UPLINK AND DOWNLINK TRANSACTIONS ON AN INTER-PROCESSOR COMMUNICATION LINK" filed Jun. 12, 2015, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The disclosure relates generally to the field of electronics devices, as well as networks thereof. More particularly, in one exemplary aspect, the disclosure is directed to methods and apparatus for implementing an inter-processor communication (IPC) link between two (or more) independently operable processors. Various aspects of the present disclosure are directed to, inter alia, run time processing, power management, boot sequencing and error handling.

DESCRIPTION OF RELATED TECHNOLOGY

Various bus architectures and techniques have evolved over time which are able to handle increasingly faster data rates, and to provide higher levels of data throughput. One such example is Peripheral Component Interconnect Express (PCIe); see e.g., PCI Express Base Specification Revision 3.1 dated Oct. 8, 2014, which is incorporated herein by reference in its entirety. PCIe is a high-speed serial computer expansion bus standard designed to replace older PCI and similar bus standards. Consistent with the foregoing, PCIe has historically been used as serial computer expansion bus technology, and has had limited applicability beyond such applications.

In terms of architecture, PCIe is based on point-to-point connectivity with separate serial links connecting every endpoint component (e.g., graphics card, memory, etc.) to the root complex (e.g., host processor).

PCIe has many desirable attributes in terms of, inter alia, performance and flexibility. However, PCIe (as well as some other existing "computer-centric" bus technologies) suffer certain disabilities, especially from the standpoint of portable consumer electronic device implementations. Specifically, as noted above, extant PCIe technologies were developed for use within desktop, server, and laptop computers, which are to varying degrees agnostic to many electrical power considerations affecting smaller portable devices. Desktops and servers (and to a lesser degree laptops) are less concerned with electrical power consumption/conservation, and more concerned with bus performance, ability to "hot plug", and the like. Accordingly, implementing a technology such as PCIe which, in its current incarnation, both (i) consumes significant electrical power during operation, and (ii) has limited power management infrastructure (e.g., application or host processor and chipset "sleep" states, and management of data and transactions during such sleep states), is generally unsuitable for portable consumer electronics applications where power consumption and battery conservation are critical (such as e.g., cellular- and Wi-Fi-enabled smartphones, "phablets", portable media players, etc.).

In a related aspect, extant PCIe connectivity is unable to accommodate scenarios where the "peripheral" processor is required to operate while the "host" processor is asleep or vice versa. Such operational scenarios and requirements are quite common with the aforementioned cellular devices, media players, and similar devices.

Hence, there is a need for improved apparatus and associated methods which can leverage the high data throughput and other desirable attributes of bus technologies such as PCIe (and other "memory mapped" technologies), yet support the requirements of rigorous power management and conservation, as well as the ability to support various combinations of operational sleep states or other reduced-power modes by various chipsets within the device (including e.g., wireless modems).

SUMMARY

The present disclosure satisfies the foregoing needs by providing, inter alia, methods and apparatus for implementing an inter-processor communication (IPC) link between two (or more) independently operable processors.

In one aspect of the disclosure, an apparatus is disclosed. In one embodiment, the apparatus includes: a first and a second processor coupled via a physical bus interface; a shared memory interface configured to enable independent operation of the first and second processor; and a computer readable apparatus comprising one or more computer readable instructions. In one exemplary variant, the computer readable instructions are configured to, when executed by the first processor, cause the first processor to transmit a sleep request to the second processor, the sleep request configured to cause the second processor to disable the shared memory interface; and responsive to the second processor disabling the shared memory interface, go to sleep.

In another aspect, a processor apparatus is disclosed. In one embodiment, the processor apparatus includes a first digital processor configured for data communication with a shared memory interface, the shared memory interface configured to enable independent operation of the first digital processor and a second digital processor, and the computer readable instructions are configured to, when executed by the first digital processor, cause the first processor to transmit a sleep request to the second digital processor, the sleep request configured to cause the second digital processor to disable the shared memory interface. The first digital processor is further configured to, responsive to the second processor disabling the shared memory interface, go to sleep. In one variant, the processor apparatus comprises an integrated circuit (IC). In another variant, the processor apparatus comprises a chipset having a plurality of integrated circuits (IC) associated therewith.

In another aspect, a method is disclosed. In one embodiment, the method includes transmitting a sleep request to a second processor, the sleep request configured to cause the second processor to disable the shared memory interface; and responsive to the second processor disabling the shared memory interface, causing a first processor going to sleep. In one variant, the sleep request is transmitted by the first processor. In another variant, the sleep request is transmitted by an intermediary entity in communication with both the first and second processors.

In a further aspect, a portable electronic device is disclosed. In one embodiment, the portable electronic device comprises a wireless-enabled smartphone which includes a memory-mapped bus interface (such as a PCIe compliant interface) having inter-processor power management functions so as to optimize power consumption within the device.

In yet another aspect, a method of reducing electrical power consumption in a wireless-enabled portable electronic device is disclosed. In one embodiment, the device includes a host processor and one or more peripheral processors, at least one of the one or more peripheral processors comprising a wireless baseband processor, and the method includes: using a high-speed memory-mapped serialized bus protocol to transfer operational data between the host processor and the baseband processor; causing the host processor to transact one or more data structures across an inter-processor communication (IPC) link between the host processor and the baseband processor, the one or more data structures configured to enable at least one of the host processor and/or baseband processor to enter a sleep state without loss of operational data; and causing the at least one processor to enter the sleep state, thereby reducing the consumption of electrical power.

In a further aspect, a method of reducing electrical power consumption in a portable electronic device is disclosed. In one embodiment, the portable device includes a host processor and one or more peripheral processors, and the method includes: using a serialized bus protocol to transfer operational data between the host processor and one or more of the peripheral processors; causing the host processor to transact one or more data structures across a communication link between the host processor and the one or more peripheral processors, the one or more data structures configured to enable at least one of the host processor and/or the one or more peripheral processors to enter a sleep state; and causing the at least one processor to enter the sleep state, thereby reducing the consumption of electrical power.

In another aspect, a portable electronic device configured for power management is disclosed. In one embodiment, the portable electronic device includes: a host processor; one or more auxiliary processors in data communication with the host processor via an inter-processor communication link; and a storage apparatus in data communication with the host processor. In one implementation, the storage apparatus includes at least one computer program configured to, when executed by said host processor: cause the host processor to transact one or more data structures across the inter-processor communication link, the one or more data structures configured to enable at least one of the one or more auxiliary processors to enter a sleep state; and cause the at least one auxiliary processor to enter the sleep state, thereby reducing the consumption of electrical power.

In a further aspect, a method of operating a multi-processor System on Chip (SoC) device having one or more host processors and one or more auxiliary processors is disclosed. In one embodiment, the method includes: evaluating a plurality of conditions relating to at least one of the one or more auxiliary processors to determine whether the at least one auxiliary processor comprises a state eligible for power reduction of the at least one auxiliary processor; evaluating at least one condition relating at least one of the one or more host processors to determine whether the at least one host processor is likely to utilize the at least one auxiliary processor within a prescribed operational window; and when it is determined that both (i) the at least one auxiliary processor comprises a state eligible for power reduction of the at least one auxiliary processor, and (ii) the at least one host processor is not likely to utilize the at least one auxiliary processor within the prescribed operational window, causing the at least one auxiliary processor to enter at least one of a plurality of reduced power states so as to conserve power.

In yet another aspect, integrated circuit apparatus is disclosed. In one embodiment, the apparatus includes: at least one host processor; at least one auxiliary processor; and a shared memory interface comprising at least one data storage device, the shared memory interface in data communication with each of the at least one host processor and the at least auxiliary processor, the shared memory interface configured to provide a multi-channel inter-processor communication link configured to enable high data throughput transfers between the at least one host processor and the at least one auxiliary processor.

In another embodiment, the integrated circuit apparatus is a System-on-Chip (SoC) device fabricated using a semiconductive fabrication process (e.g., 14 nm), and includes both a first digital processor and a second digital processor in data communication with the first digital processor via an inter-processor communications link. In one variant, the first and second digital processors include substantially similar first and second processor cores (e.g., a multi-core processor). In another variant, the first digital processor includes a primary processor (e.g., CPU), and the second digital processor includes a wireless base-band (BB) processor. In yet another variant, the second digital processor includes a graphics core (e.g., co-processor). In yet another variant, the SoC includes the primary processor, an auxiliary processor (e.g., ARM core or the like), and both the graphics core and the wireless BB core, each of the auxiliary, graphics and BB cores in inter-process communication with the primary processor. In another embodiment, the integrated circuit apparatus includes two or more discrete semiconductive die having one or more of the foregoing components disposed on each of the separate die.

In another aspect, a peripheral processor apparatus is disclosed. In one embodiment, the peripheral processor is configured to utilize a shared memory interface to: determine a parameter indicating a desirability of reduced-power operation of the peripheral processor apparatus; determine a likelihood of a host processor apparatus triggering a condition that prevents the reduced-power operation of the peripheral processor apparatus; and enter the reduced-power operation based on the determined parameter and the determined likelihood.

In another aspect, a method is disclosed. In one embodiment, the method is for managing power by a first processor apparatus, and the method includes: determining a parameter indicating a desirability of reduced-power operation of the first processor apparatus; determining a likelihood of a second processor apparatus triggering a condition that prevents the reduced-power operation of the first processor apparatus; and entering the reduced-power operation based on the determined parameter and the determined likelihood.

In another aspect, an apparatus is disclosed. In one embodiment, the apparatus includes: a host processor apparatus and a peripheral processor apparatus; wherein the host processor apparatus and the peripheral processor apparatus are configured to perform data communication with each other via an inter-processor communication link; and wherein the peripheral processor apparatus is further configured to: determine a desirability of reduced-power operation of the peripheral processor apparatus; determine a likelihood of the host processor apparatus triggering a condition that prevents the reduced-power operation of the peripheral processor apparatus; and enter the reduced-power operation based on the determined desirability of reduced-power operation and the determined likelihood of the host processor apparatus triggering the condition.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIGS. 9A-11A are logical representations of an alternate exemplary transfer descriptor ring (TDR) at various stages of processing, in accordance with the principles described herein.

FIG. 14 is a logical block diagram of exemplary independent state machines within each processor which support a peripheral processor initiated sleep mode, useful in conjunction with the various described embodiments.

Figure 1:
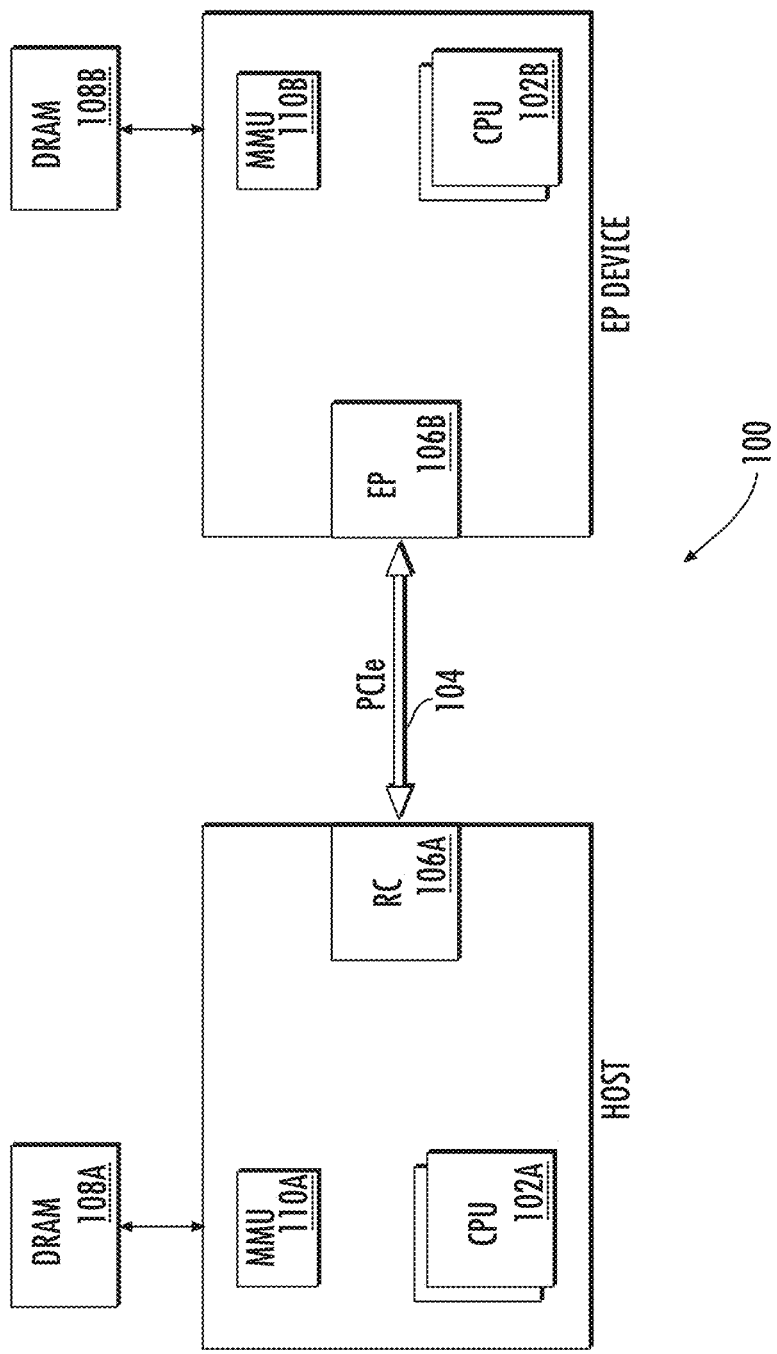
FIG. 1 is a logical block diagram of one exemplary apparatus useful for illustrating various principles described herein.

All Figures © Copyright 2014-2015 Apple Inc. All rights reserved.

DETAILED DESCRIPTION

Reference is now made to the drawings, wherein like numerals refer to like parts throughout.

Detailed Description of Exemplary Embodiments

Exemplary embodiments of the present disclosure are now described in detail. While these embodiments are primarily discussed in the context of an inter-processor communication (IPC) link (for example, of the type described within commonly owned and co-pending U.S. patent application Ser. No. 14/856,283 entitled "METHODS AND APPARATUS FOR AGGREGATING PACKET TRANSFER OVER A VIRTUAL BUS INTERFACE", filed Sep. 16, 2015, previously incorporated herein by reference in its entirety), it will be recognized by those of ordinary skill that the present disclosure is not so limited. In fact, the various aspects of the disclosure are useful in any device or network of devices that is configured to incorporate and coordinate multiple independent processing elements, as is disclosed herein.

Various embodiments described herein may be used in conjunction with power management schemes such as those described within commonly owned and co-pending U.S. patent application Ser. No. 14/879,024 entitled "METHODS AND APPARATUS FOR RUNNING AND BOOTING AN INTER-PROCESSOR COMMUNICATION LINK BETWEEN INDEPENDENTLY OPERABLE PROCESSORS", filed Oct. 8, 2015, previously incorporated herein by reference in its entirety.

Additionally, various embodiments described herein may also be used in conjunction with error recovery schemes, such as those described within commonly owned and co-pending U.S. patent application Ser. No. 14/879,030 entitled "METHODS AND APPARATUS FOR RECOVERING ERRORS WITH AN INTER-PROCESSOR COMMUNICATION LINK BETWEEN INDEPENDENTLY OPERABLE PROCESSORS", filed Oct. 8, 2015, previously incorporated herein by reference in its entirety.

Further, while the following embodiments describe specific implementations of e.g., dedicated address spaces, legacy support capabilities, and specific protocols, those of ordinary skill in the related arts will readily appreciate that such descriptions are purely illustrative.

Moreover, while exemplary implementations are described in the context of the PCIe protocol, it will be appreciated that the various features and techniques described herein can be applied to other bus protocols, including especially those based on memory-mapped schemes.

Exemplary Inter-Processor Communications Link

As previously noted, bus techniques have evolved which are able to handle faster data rates and provide higher levels of data throughput. One such example is Peripheral Component Interconnect Express (PCIe). PCIe has historically been used as a high-speed serial computer expansion bus technology; PCIe is based on point-to-point connectivity with separate serial links connecting every endpoint component (e.g., graphics card, memory, etc.) to the root complex (e.g., host processor). However, existing PCIe technologies consume significant power and are unsuitable for most portable consumer electronics applications. Additionally, PCIe connectivity is unable to accommodate scenarios where the "peripheral" processor is required to operate while the "host" processor is asleep or vice versa (as is common with cellular devices and portable media players).

Within this context, exemplary methods and apparatus are now described which support an inter-processor communication (IPC) link between two (or more) independently operable processors. The following discussions will be described in reference to a "root complex" (RC) (or "host") processor, and an "endpoint" (EP) (or "peripheral") processor. For reasons which will become apparent below, it is appreciated that the designation as to host or peripheral processor is used to simplify and/or clarify the following explanations, and does not imply existing host or peripheral functionality, or that such roles cannot be reversed.

In one aspect, the IPC protocol is based on a "shared" memory interface for run-time processing (i.e., the independently operable processors each share, either virtually or physically, a common memory interface). In one such embodiment, the shared memory interface provides a multi-channel IPC path for high throughput transfers. In one exemplary implementation, the shared memory interface remains functional when any one of the independently operable processors is active, even when one or more of the remaining independently operable processors are asleep, powered down, powered off, etc.

In another aspect, the IPC communication link is configured to support a host-driven boot protocol used during a boot sequence, so as to establish a basic communication path between the peripheral and the host processors. In one exemplary embodiment, the host processor maps the entire boot image to a contiguous area of memory, and provides the base address and size of the image over the IPC communication link to the peripheral processor.

Various other embodiments described herein include, inter alia, sleep procedures (as defined separately for the host and peripheral processors), and error handling.

As used herein, the term "logical" or "virtual" are interchangeably used to refer to, without limitation, an abstraction (typically performed in software or machine logic) to represent physical mechanisms, attributes or functionalities as a data structure. For example, as used herein a "logical bus interface", "virtual bus interface", etc. refers generally to an abstraction or representation of a bus interface as a series of data structures. In contrast, as used herein a "physical bus interface" refers to the physical mechanisms, attributes or functionalities of a physically tangible bus interface.

As used herein, the term "in-band" refers without limitation to data transactions which are transacted within a logical or physical interface, and which affect the mechanisms, attributes or functionalities of the logical or physical interface. In contrast, the term "out-of-band" refers to data transactions which are not transacted within a logical or physical interface, and which affect the mechanisms, attributes or functionalities of the logical or physical interface.

FIG. 1 illustrates exemplary apparatus 100 useful for illustrating various principles described herein. As shown, the apparatus 100 includes a first and second processor (102A, 102B), and a physical bus interface 104 that is configured to implement an inter-processor communication (IPC) link between two (or more) independently operable processors.

In one implementation, the first processor 102A includes an applications processor (AP). As shown in FIG. 1, the first processor 102A is coupled to a Root Complex (RC) 106A which functions as the host of the IPC bus.

In one implementation, the second processor 102B includes a wireless modem. As used herein, the term "wireless" includes, without limitation, Long Term Evolution/Advanced (LTE and LTE-A) technology, devices implementing IEEE-Std. 802.11 (any variants thereof), PAN technology such as e.g., Bluetooth or IEEE Std. 802.15.4, "ZigBee", near field communication/RFID, WiMAX (IEEE 802.16), WMANs, 3G cellular (e.g., WCDMA, 3GPP, 3GPP2, and GSM and improvements thereon, and ISM band devices.

In other embodiments, the second processor 102B may be e.g., a media processor, or other network processing element. As shown in FIG. 1, the second processor 102B is coupled to an Endpoint (EP) 106B which functions as the peripheral of the IPC bus.

As shown, both the first and the second processors (102A, 102B) are each coupled to a non-transitory computer readable medium (e.g., dynamic random access memory (DRAM)) (108A, 108B) and a memory management unit (MMU) (110A, 110B). The non-transitory computer readable medium is configured to store computer readable instructions for execution.

Figure 2:
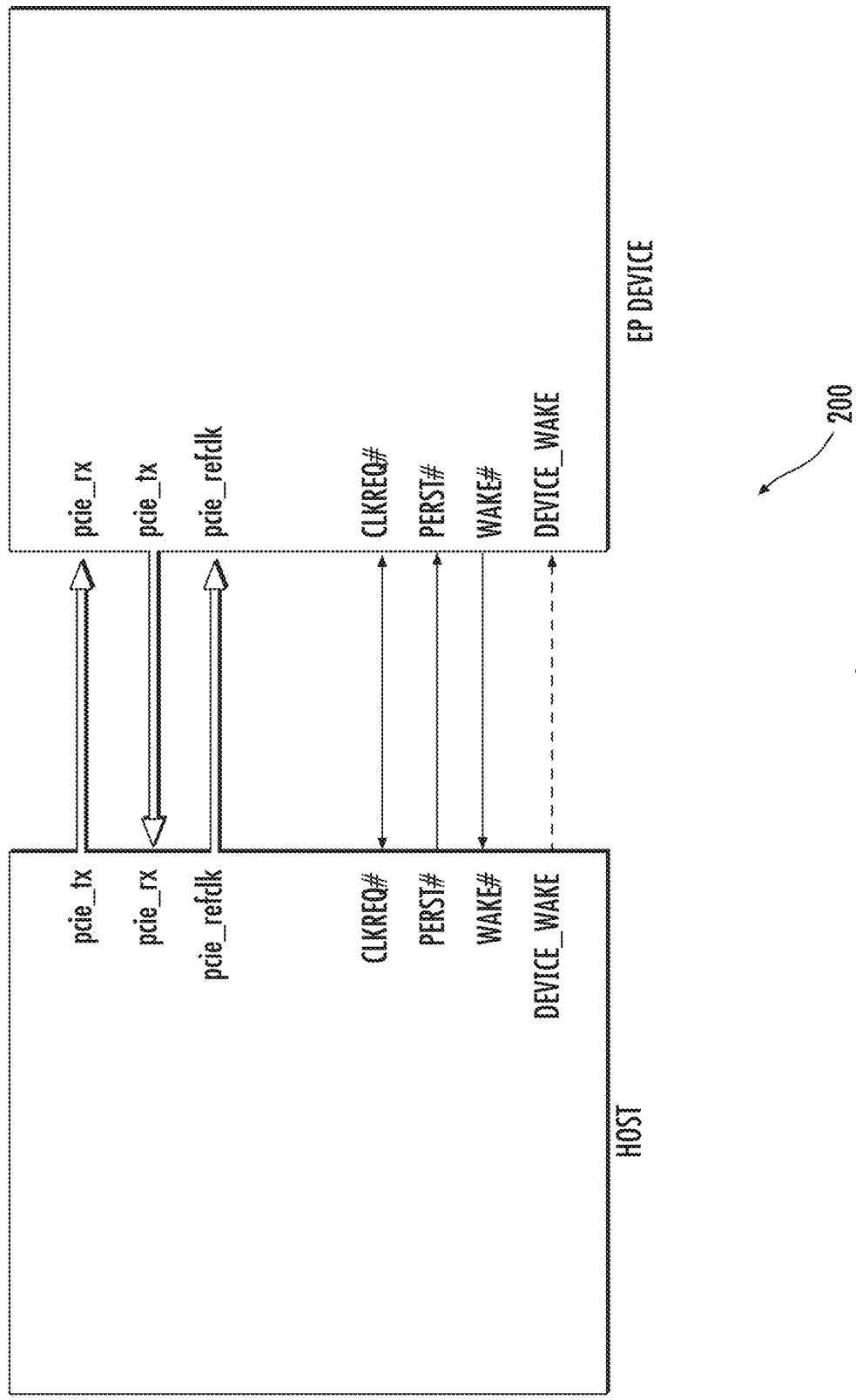
FIG. 2 is a logical block diagram of one exemplary physical bus interface useful in conjunction with the various principles described herein.

As shown in FIG. 2, the physical bus interface 104 is loosely based on the Peripheral Component Interconnect Express (PCIe) standard (e.g., as is described in "PCI Express Base Specification Revision 3.0" published Nov. 10, 2010, and "ECN L1 PM Substates with CLKREQ" approved Aug. 23, 2012, incorporated by reference herein in their entireties). Those of ordinary skill in the related arts, given the contents of the present disclosure, will readily appreciate that other bus interface standards may be substituted with equal success. Various modifications to the underlying physical bus interface 104 (and protocols used therewith) to support IPC functionality is described in greater detail hereinafter.

In the exemplary embodiment, the physical bus interface 104 is a point-to-point communication channel between two IPC ports (the RC and EP) allowing both to send/receive access requests (configuration read/write, I/O read/write, memory read/write) and interrupts. At the physical level, a link is composed of one or more lanes (one shown in FIG. 2), each lane having receive and transmit component (pcie_rx, pci_tx). Each lane is a full-duplex byte stream, transporting data packets in eight-bit 'byte' formats, between the RC and EP of a link, in both directions simultaneously. The physical bus interface 104 can support multiple logical links (or virtual bus interfaces) representing multiple ongoing data sessions.

In one such embodiment, each virtual bus interface further includes one or more "sessions" which are a persistent and/or semi-persistent set of data transactions (e.g., datagrams) between two logical endpoints. In some embodiments, the session may include "stateful" transactions (i.e., the data transactions are based on a current state of the session), and/or "stateless" transactions (i.e., the data transactions are not based on a current state of the session).

Exemplary Boot Sequencing

Figure 3:
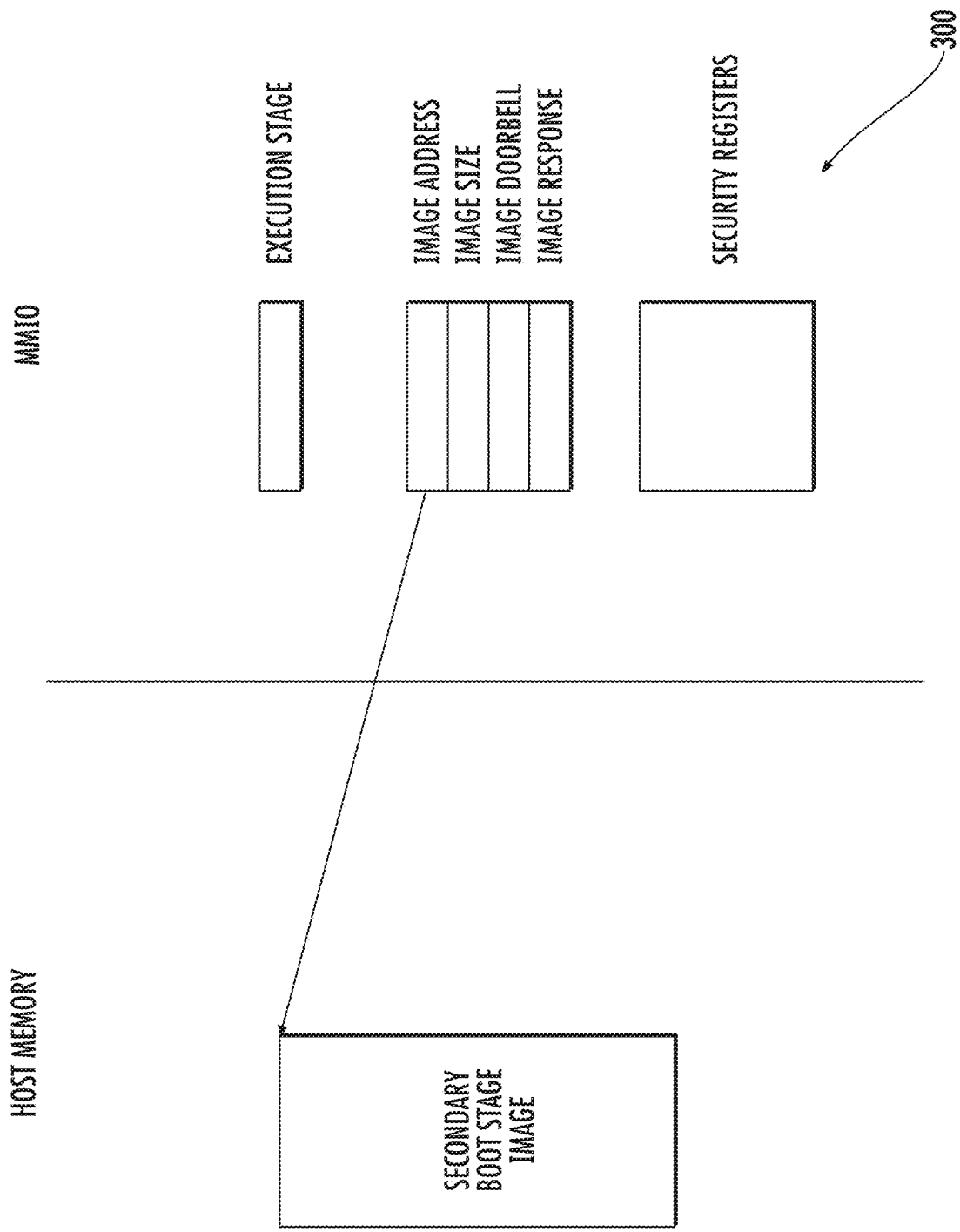
FIG. 3 is a logical representation of a shared memory interface configured to enable host assisted boot sequencing, in accordance with one implementation of the present disclosure.

In one aspect, the computer readable instructions, when executed by at least one of the first or second processors (102A, 102B) is configured to enable host assisted boot sequencing. FIG. 3 describes an exemplary embodiment where the peripheral processor does not have a complete boot image stored in e.g., Flash memory (i.e., operates as a "flashless" EP device); accordingly, the host processor must initialize the peripheral processor to the next (secondary) boot stage image and switch the peripheral processor execution to the next boot stage image. In typical implementations, the next boot stage image can be entirely mapped within contiguous memory; the host processor can provide the base address and size of the image over the memory mapped input/output (MMIO) of the EP device (which, as described hereinafter, resides virtually within shared memory space). Thereafter, the EP device receives the next boot stage image. In one such variant, the next boot stage image is provided over the IPC link. In some cases, the peripheral processor additionally reports a success or failure status to the host processor before switching to run time operation.

In one exemplary embodiment, the peripheral processor also updates the current execution stage in the MMIO space (which exposes the peripheral processors current execution stage to the host processor), thereby enabling simultaneous access during boot operations (and other operations e.g., run-time, etc.). In some variants, the EP device can expose security-related information over MMIO during boot sequencing.

Figure 4:
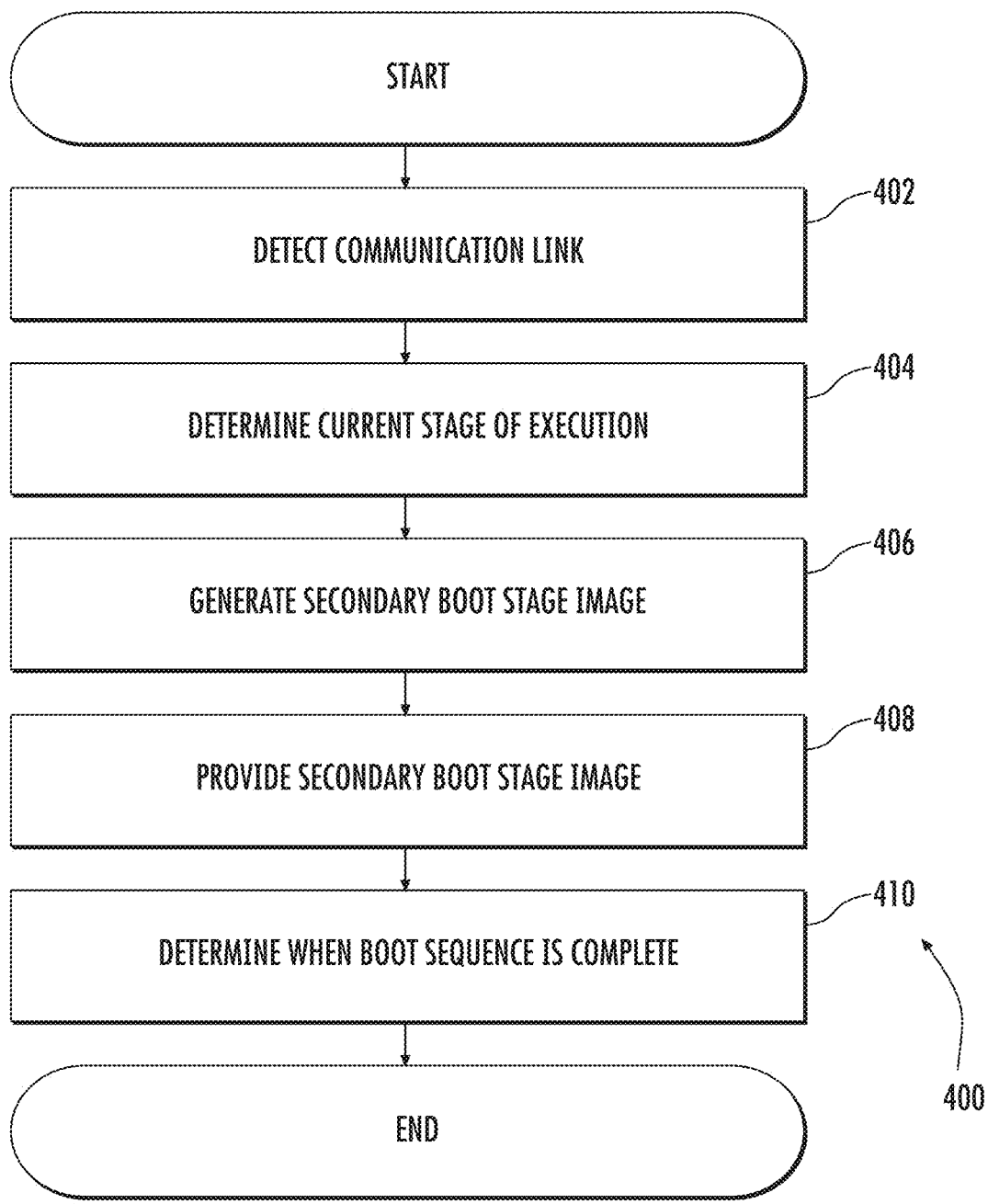
FIG. 4 is a generalized logical flow diagram illustrating an exemplary boot process for a host processor, in accordance with one implementation of the present disclosure.

The following discussion of FIG. 4 details one exemplary boot process 400 for the host processor.

At step 402, a communication link is detected by the host processor, and the peripheral processor is enumerated. In one exemplary implementation, the communication link is an IPC link that is loosely based on PCIe (such as is illustrated within FIG. 2, described supra), the host processor includes a Root Complex (RC) and the peripheral processor includes an Endpoint (EP). In one such variant, the enumeration process includes an initial query of the devices connected to the host processor (e.g., the aforementioned peripheral processor) and an assignment of each connected device to address.

At step 404, the communications link driver on the host processor determines the peripheral processor's current stage of execution. In one exemplary embodiment, the host processor reads a register within a shared memory interface (e.g., a mapped input/output (MMIO)) to determine the execution stage.

At step 406, when the host processor determines that the peripheral processor is in a primary boot sequence (e.g., executed from a boot read only memory (ROM) local to the peripheral processor), then the host processor loads an appropriate driver and generates/retrieves an appropriate secondary boot stage image therewith.

At step 408, the host processor provides the secondary boot stage image to the peripheral processor. In one exemplary embodiment, the host processor maps the secondary boot stage image to the shared memory interface (e.g., MMIO). In some variants, the secondary boot stage image has been optimized as a single contiguous image to optimize processing. However, those of ordinary skill in the related arts will readily appreciate (given the contents of the present disclosure), that excessive ranges of contiguous portions of memory may not be ideal for other reasons e.g., for memory management. Additionally, the secondary boot stage image may be limited in size (i.e., may not exceed a maximum size) so as to comply with communication link requirements.

In some embodiments, the provisioning of the secondary boot stage image includes writing a base address and size of the secondary boot stage image (or memory buffer containing it) to the appropriate image address and image size registers of the shared memory interface. Thereafter, the host processor can notify the peripheral processor of the secondary boot stage image by e.g., writing to an image "doorbell" register of the MMIO to instruct the peripheral processor to start processing the image. Responsive to the doorbell, the peripheral processor will retrieve the image. When the peripheral processor has read and processed the image, the peripheral processor will notify the host by sending an interrupt. In one embodiment, the notification is a message signaled interrupt (MSI or MSI vector) (a PCIe-based mechanism that allows the EP device to send an interrupt to the host). In some cases, the notification may have a dedicated mechanism (e.g., a designated vector number).

As used herein, a "doorbell" signal refers to any signal, register, or interrupt that is used by the host to indicate to the peripheral that there is some work to be done (e.g., data processing, control flow, etc.). Analogously, as used herein, the MSI is used by the peripheral to notify the host of work to be done. For example, in one exemplary implementation, one processor (e.g., the host) will place data in a shared memory location(s), and "ring the doorbell" by writing to a designated memory location (the "doorbell region"); responsively, the peripheral processor can process the data.

Accordingly, at step 410, when the host processor receives the notification, the host processor reads the image response register to determine whether the boot sequence has completed. Upon successful completion (or alternatively, when the next execution stage is started), the host loads a run time communication link driver.

Figure 5:
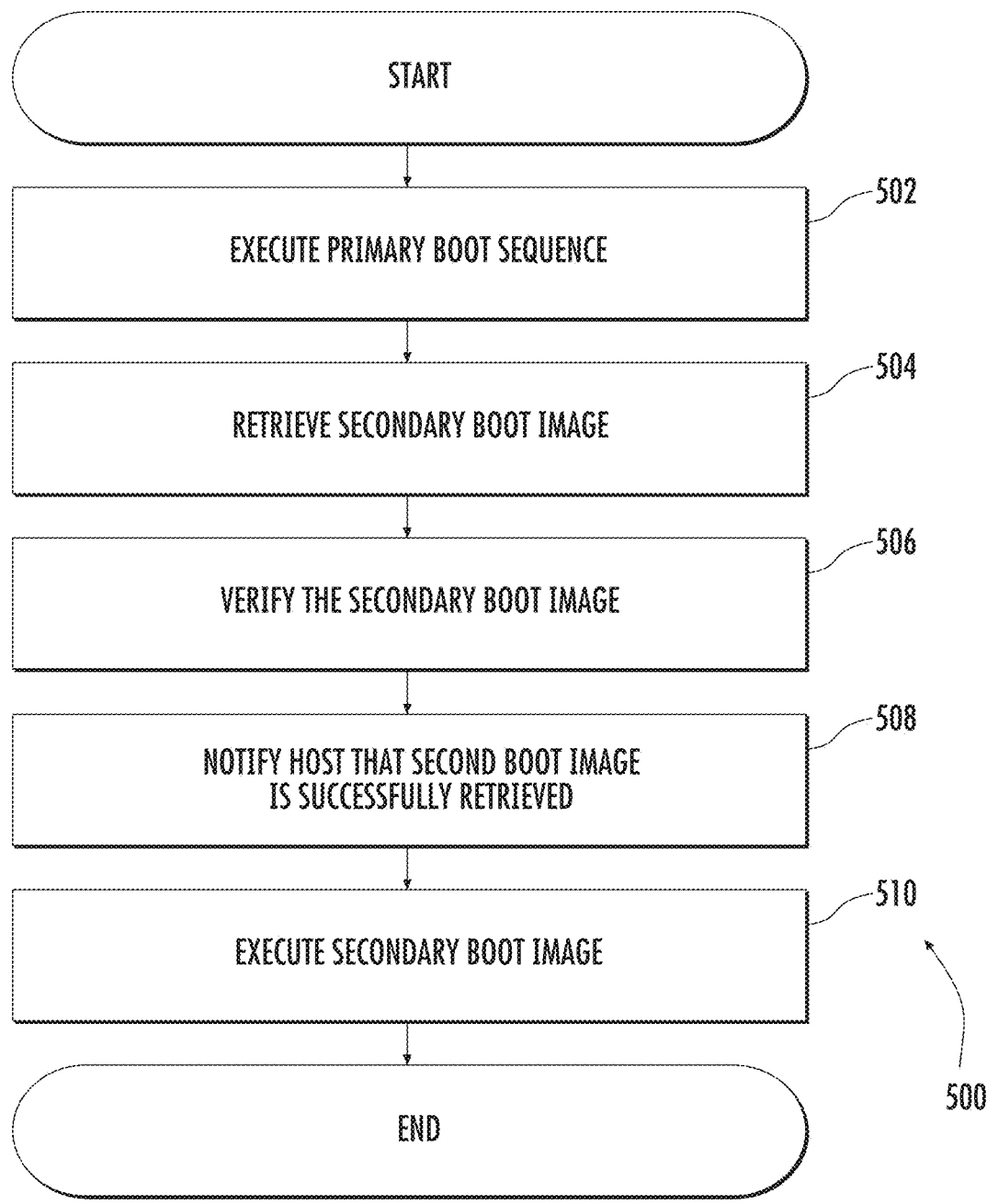
FIG. 5 is a generalized logical flow diagram illustrating an exemplary boot process for a peripheral processor, in accordance with one implementation of the present disclosure.

The following discussion of FIG. 5 details one exemplary boot process 500 for the peripheral processor.

In one embodiment, the execution stage register of the shared memory interface for the peripheral processor is set to default to boot from its local memory (e.g., boot ROM mode). Those of ordinary skill in the related arts, given the contents of the present disclosure, will appreciate other applicable boot schemes suitable herewith.

At step 502, the peripheral processor executes an initial primary boot sequence which may include e.g., a Link Training and Status State Machine (LTSSM) (such as the type described within the PCIe specification, previously incorporated by reference supra) and enumerating the peripheral processor to a communication link of a host processor.

At step 504, thereafter, responsive to receiving a notification from the host processor, the peripheral processor retrieves one or more secondary boot images. In one exemplary embodiment, the notification is an image doorbell register of the MMIO that signifies that the secondary boot image is available. Responsive to the doorbell, the peripheral processor will retrieve the image based on e.g., image address and image size registers of the shared memory interface. In one exemplary embodiment, the retrieval comprises a direct memory access (DMA) of the shared memory interface, which is executed via the communication link.

Those of ordinary skill in the related arts will recognize that any number of secondary boot stage images may be used (including subsequent tertiary, quaternary, etc. stages) to support varying levels of boot sequence complexity. For example, a first secondary boot stage and a second secondary boot stage may be executed from the primary boot stage; and subsequently, one of the secondary boot stages may additionally incorporate subsequent tertiary boot stages, etc.

At step 506, the peripheral processor may first verify, or validate the image to ensure that the image is e.g., secure, and not corrupted. Common examples of validation include e.g., certificate authentication, cyclic redundancy checks (CRC), parity checks, etc.

When the peripheral processor successfully retrieves the secondary boot stage image, the peripheral processor sets the image response register and sends a notification to the host processor (step 508) (within the MMIO or the shared host memory). Thereafter, the peripheral processor executes the secondary boot stage image (step 510). Otherwise, if the peripheral processor fails to retrieve the secondary boot stage image (or if an invalid condition is met e.g., corrupt boot image, etc.), then the peripheral processor triggers a fatal error condition.

In the event of a fatal error condition, the host processor will perform error recovery procedures. In some variants, the host processor will responsively reset the peripheral processor. In other variants, the host processor will abort the peripheral processor boot. Various other error recovery schemes are described in greater detail hereinafter.

Exemplary Run Time Processing

Figure 6:
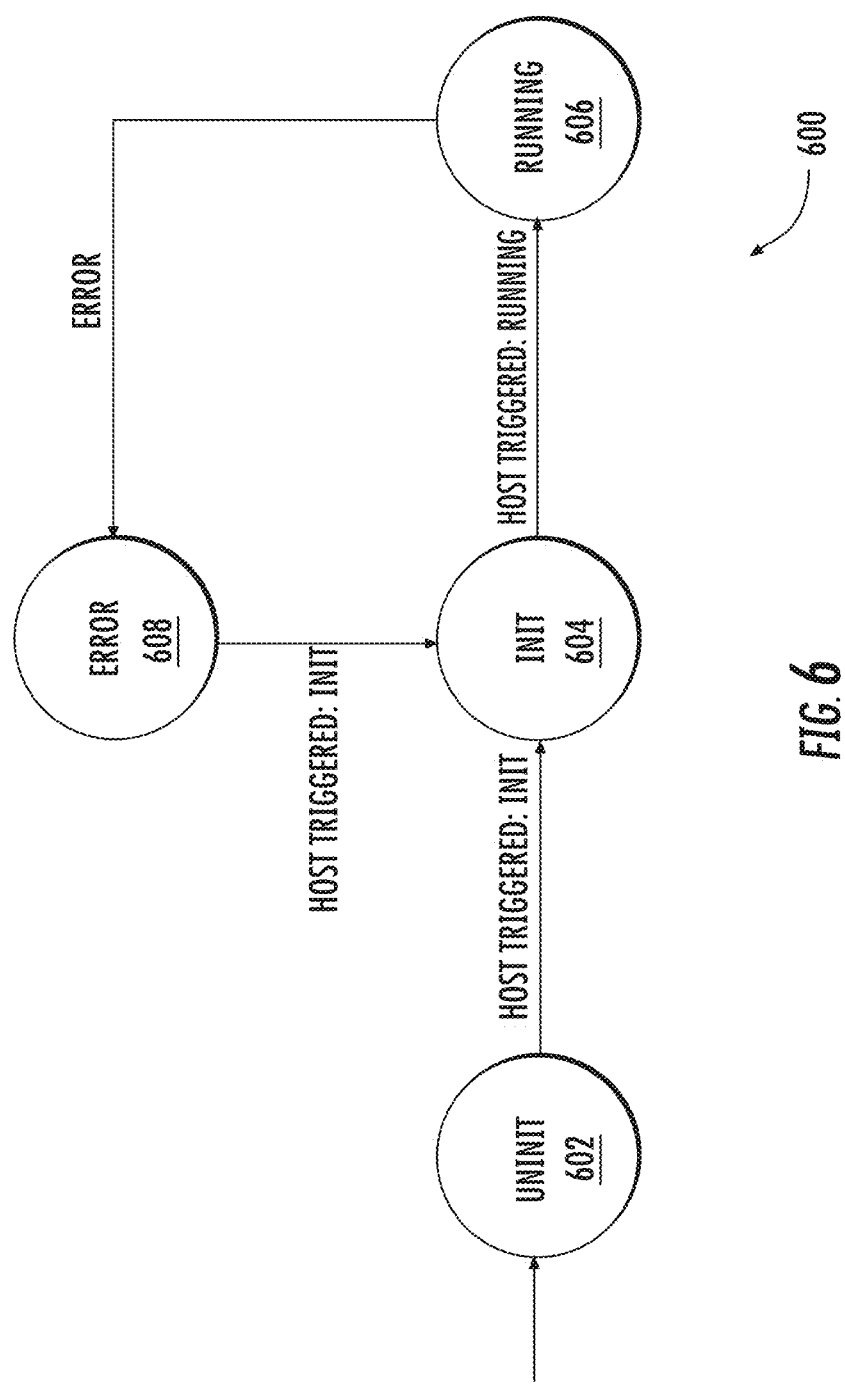
FIG. 6 is a logical block diagram of an exemplary run time operation state machine useful in conjunction with the various described embodiments.

In one aspect, the computer readable instructions, when executed by at least one of the first or second processors (102A, 102B) is configured to transact data via a run time processing protocol that is based on a shared memory architecture. FIG. 6 illustrates one exemplary embodiment of a Run Time IPC State Machine 600. In the exemplary embodiment, the first and second processor share a shared memory interface that includes a memory mapped input/output (MMIO) space.

In one embodiment, the state machine comprises four (4) states; in one exemplary variant, the four (4) states are controlled by two registers in the MMIO: IPC Status, and IPC Control. IPC Status is read-only for the host processor and read/write for the peripheral processor and reflects the peripheral processor's IPC state machine. IPC Control is write-only for the host and read-only for the peripheral processor. IPC Control allows the host processor to trigger IPC state machine transitions. Writing to IPC Control triggers an interrupt for the peripheral processor.

In the exemplary embodiment of FIG. 6, the Run Time IPC State Machine starts in the UnInit State 602 (e.g., a default state from reset, power-down, power-off, etc.) When the host processor writes an initialize command to the IPC Control register, the state machine changes to the Init State 604. Responsively, the peripheral processor sets up and initializes its local data structures, and updates the IPC Status register to signal that the Init State 604 has completed. In some embodiments, the peripheral processor may additionally notify the host processor (e.g., with a message signaled interrupt (MSI) i.e., a PCIe-based mechanism that allows the peripheral processor to send an interrupt to the host processor). Concurrently, the host processor can initialize its own data structures; when the host processor receives the notification, it checks the IPC Status register to detect the completed change to Init State 604.

From the Init State 604, the host processor updates the shared memory interface (e.g., the MMIO register Context Information Address) and triggers the transition to the Running State 606 by writing a run command to the IPC Control register. Responsively, the peripheral processor reads the Context Information and updates the IPC Status register to Running.

As described in greater detail hereinafter, in the Running state 606, data transfers can take place between the host and the peripheral processor; however, in the event of an error condition on either the host or the peripheral processor, the IPC state machine transitions to the Error State 608. The host informs the peripheral processor of an error by writing an error flag to the IPC Control register. In contrast, the peripheral processor informs the host processor of an error (internal or host initiated), by updating the IPC Status register to Error.

From the Error state 608, the peripheral processor clears its current Context Information Address and terminates further host memory access. In some cases, the peripheral processor may store a mirror copy of a few critical peripheral processor registers i.e. Execution Stage Mirror and IPC Status Mirror, in the host memory (in a location specified for device information). Once the peripheral processor has the device information address, it updates the mirror copy of these registers in host memory each time the local register changes, followed by a MSI. The IPC Status Mirror is updated by the peripheral processor as part of the Running and Error States (606, 608).

Referring back to the Running State 606 of FIG. 6, in one exemplary embodiment, data transfers are performed as a series of data transactions over unidirectional "pipes". A pair of pipes creates a bi-directional interface. While the following discussion is provided within the context of a "full-duplex" scheme, those of ordinary skill in the related arts will readily appreciate that the described protocols may be substituted with equal success with so-called "half duplex" schemes, given the contents of the present disclosure.

In one exemplary embodiment, a client service (e.g., control, data, trace, etc. associated with a data session) is associated with a single interface i.e. a pair of pipes. Each client service input/output (I/O) may be composed of multiple so-called "transfer descriptors" (TD). For example, a single TD may describe a physically contiguous memory buffer, accessible by the host/peripheral processor over the communication link.

Each pipe (i.e., data stream) is associated with one "transfer descriptor ring" (TDR). The TDR data structure resides in host processor memory and is accessible by the peripheral processor. Each TDR is described by a head pointer and a tail pointer, and encompasses one or more TD; each TD includes: an address of a buffer in host memory, a size of the buffer, a next count that indicates the number of TDs remaining in an I/O transfer, and a completion status. The head pointer points to the next empty slot in the TDR, whereas the tail pointer points to the address of next TD which the peripheral will process. The head pointer is written by the host and read by the peripheral. The tail pointer is read by the host and written by the peripheral. All TDs and associated data buffers between the tail pointer and the head pointer are associated with the peripheral processor. When the head pointer is equal to the tail pointer, the TDR is empty.

The peripheral processor provides an array of so-called "doorbell" registers, and a so-called "head pointer doorbell array" (HPDA) which is further indexed by pipe number. The host processor notifies the peripheral processor of a new TD in a TDR by writing the head pointer value in the doorbell register at a pipe number offset inside the HPDA. Similarly, the host provides a so-called "tail pointer array" (TPA) in host memory that is indexed by pipe number, which is updated by the peripheral processors with tail pointer values to indicate completion of a TD.

Figure 7:
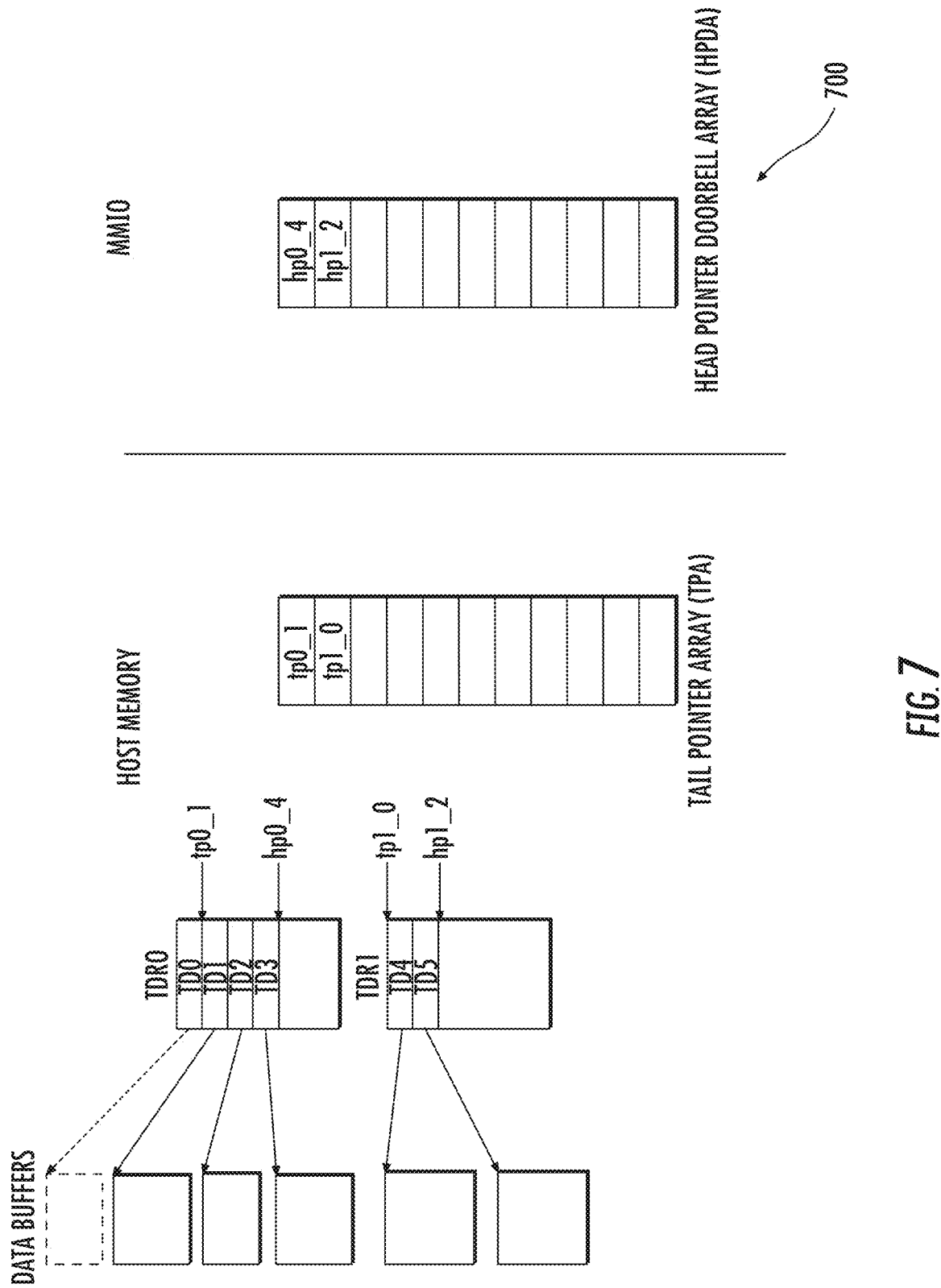
FIG. 7 is a logical representation of one exemplary dual pipe data structure comprising two (2) transfer descriptor ring (TDR) data structures each of which comprises a number of transfer descriptors (TDs), useful in conjunction with the various described embodiments.

FIG. 7 illustrates one exemplary data structure 700 described supra. The data structure 700 includes a first pipe (TDR0) in the uplink direction (from the host to the peripheral), and a second pipe (TDR1) in the downlink direction (from the peripheral to the host). As shown, the host processor has queued four (4) TDs in TDR0 for uplink transfer and informed the peripheral processor by writing the address (hp0_4) at the TDR0 head pointer offset in the HPDA (0). After the peripheral processor has successfully transmitted the data for TD0, it updates the TPA entry (0) by writing a new tail pointer address (tp0_1). When the peripheral processor updates the appropriate TPA entry, the host can free the corresponding data buffer from memory.

Similarly, as shown, the host has queued two (2) TDs in TDR1 for downlink transfer and informs the peripheral process device by writing hp1_2 at offset 1 in HPDA. Once the peripheral processor consumes these TDs, it will update TPA to inform the host.

In some implementations, the TDs may be "aggregated" into a larger scatter-gather TD to support so-called "scatter-gather" behavior for large I/O transfers (e.g., each procedure-call sequentially writes data from multiple buffers to a single data stream or reads data from a data stream to multiple buffers; the so-called "scatter/gather" refers to the process of gathering data from, or scattering data into, the given set of buffers.)

Figure 7A:
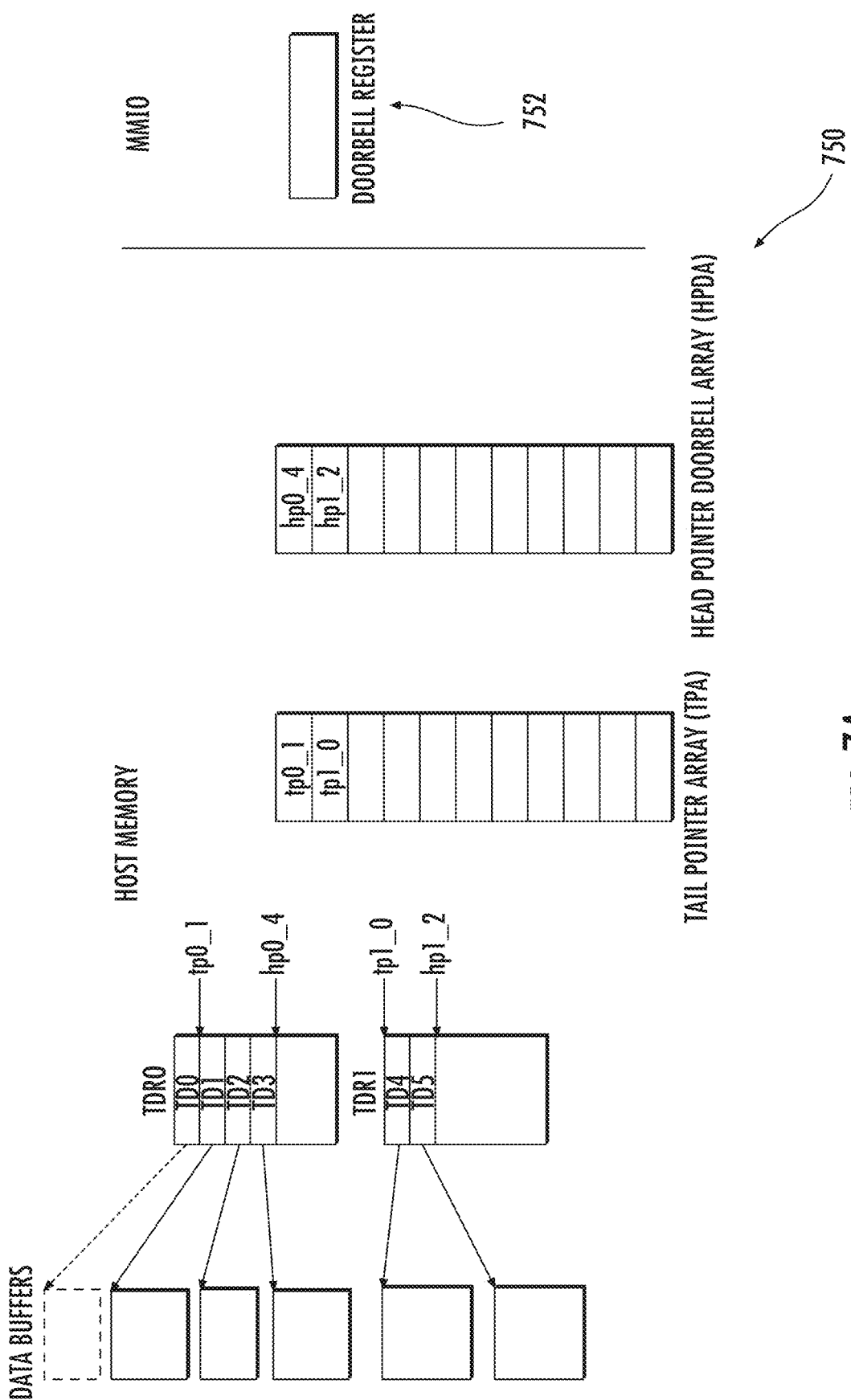
FIG. 7A is a logical representation of an alternate exemplary dual pipe data structure comprising two (2) transfer descriptor ring (TDR) data structures each of which comprises a number of transfer descriptors (TDs), useful in conjunction with the various described embodiments.

FIG. 7A illustrates an alternate exemplary data structure 750 described supra (here, with a "doorbell register" 752 disposed in the MMIO, and the doorbell array disposed in the host processor (e.g., AP).

Figure 8:
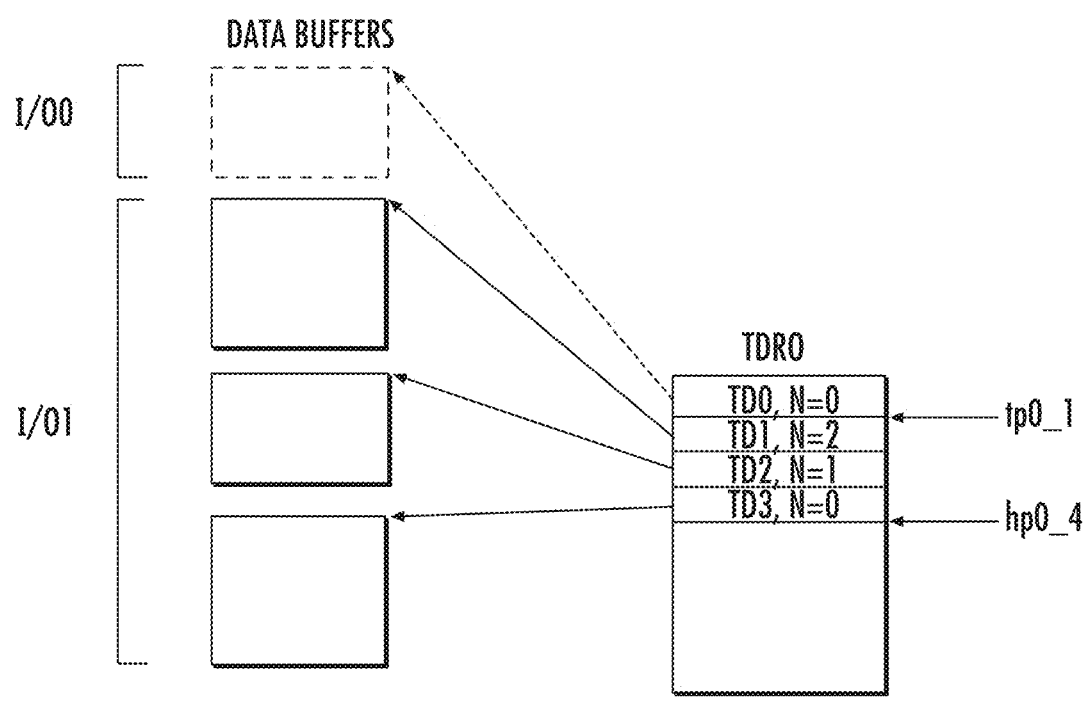
FIG. 8 is a logical representation of one exemplary scatter-gather input/output (I/O) transfer, useful in conjunction with various described embodiments.

FIG. 8 illustrates one exemplary scatter-gather TD 800 which is described by three (3) TDs according to an exemplary "scatter-gather" scheme. Each TD indicates the remaining count of TDs in the aggregate scatter-gather TD. For example, as shown, I/O1 includes TD1 which continues to TD2 (two (2) TDs remain e.g., N=2), and TD2 continues to TD3 1 (one (1) TD remains N=1), and TD3 points to TD0 which is the last descriptor in the transfer (N=0, no remaining TDs). Each TD contains a pointer to the data buffer in host memory (indicating the address to be accessed by the peripheral to perform the data transfer) and a size field (indicating the size of the data transfer). For uplink TDRs, the size field is read-only for the peripheral, whereas for downlink TDRs the size field may be read/write for the peripheral. During a downlink transfer, the peripheral reads the size field to determine the maximum size of the buffer available. After the downlink transfer, the peripheral may update the size field with the actual size of data written into the buffer.

Figure 8A:
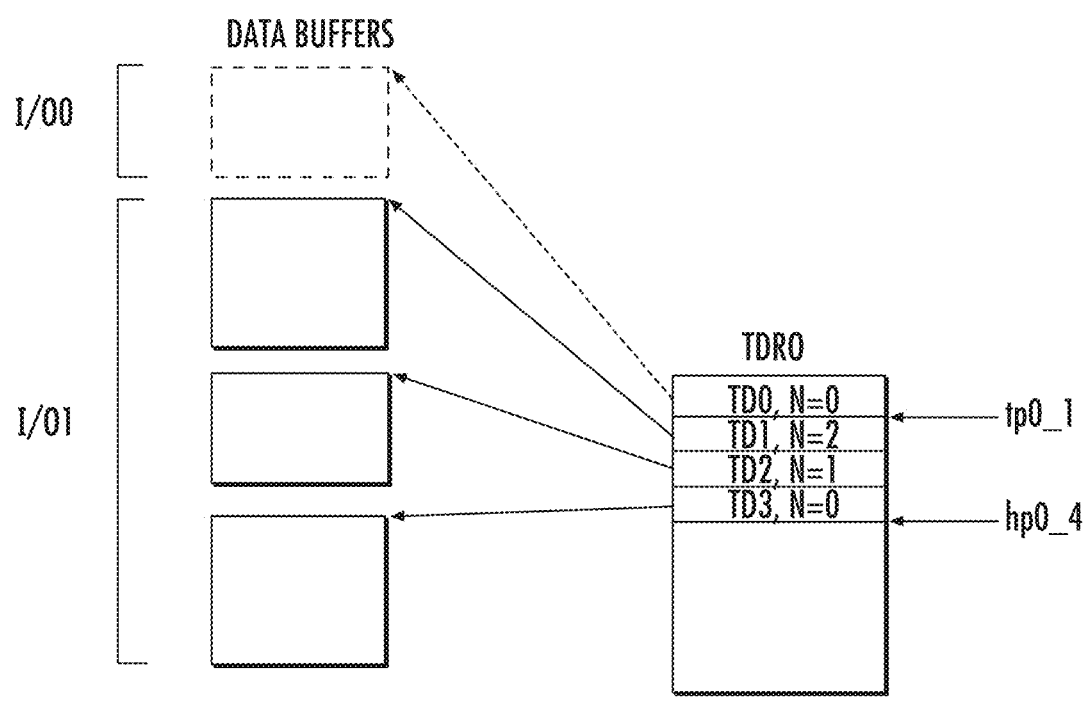
FIG. 8A is a logical representation of an alternate exemplary scatter-gather input/output (I/O) transfer, useful in conjunction with various described embodiments.

FIG. 8A illustrates an alternate exemplary scatter-gather TD 850, which is described by three (3) TDs according to an exemplary "scatter-gather" scheme, and which is useful with the data structure 750 of FIG. 7A.

Figure 9:
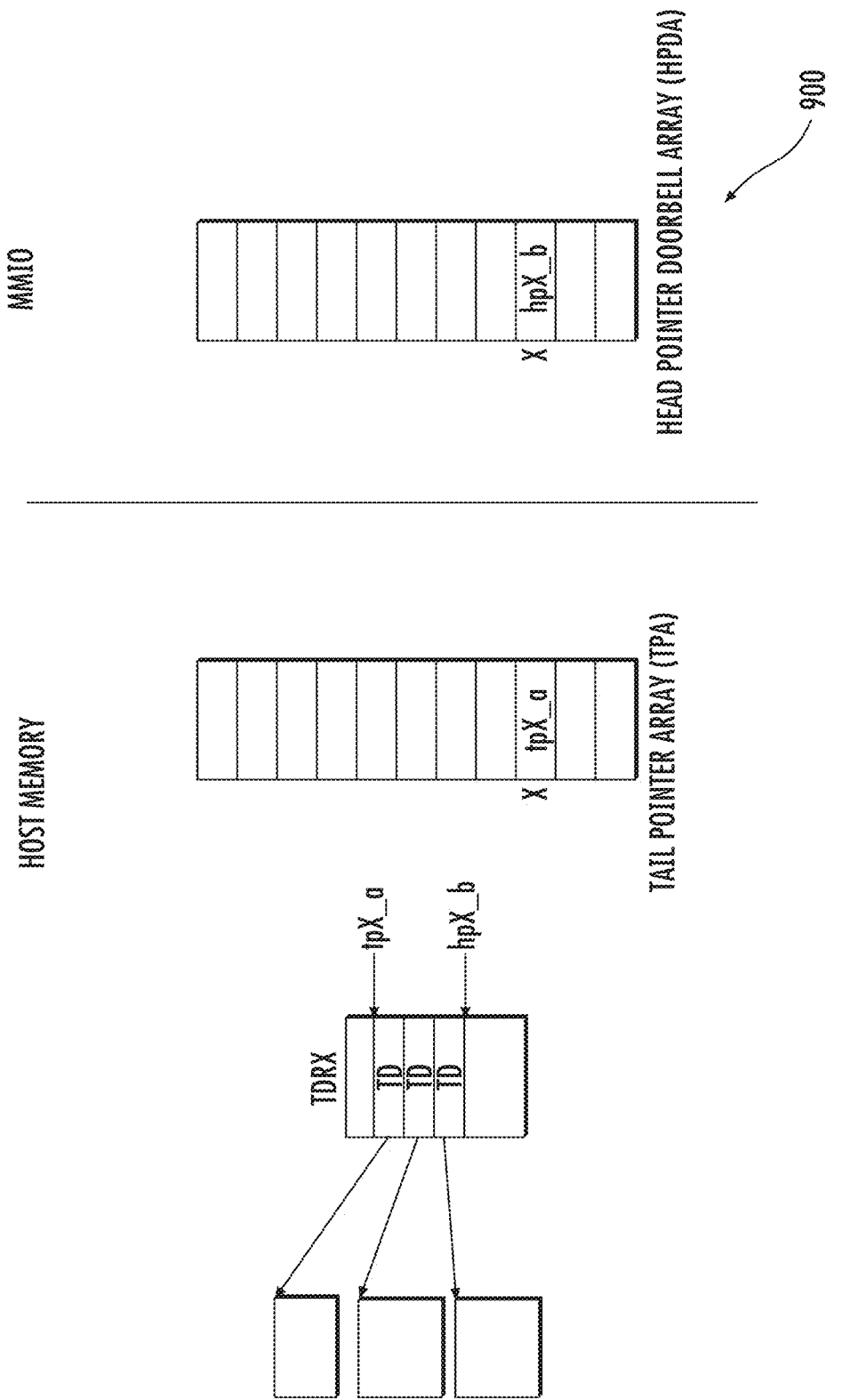
FIGS. 9-11 are logical representations of one exemplary transfer descriptor ring (TDR) at various stages of processing, in accordance with the principles described herein.
Figure 9A:
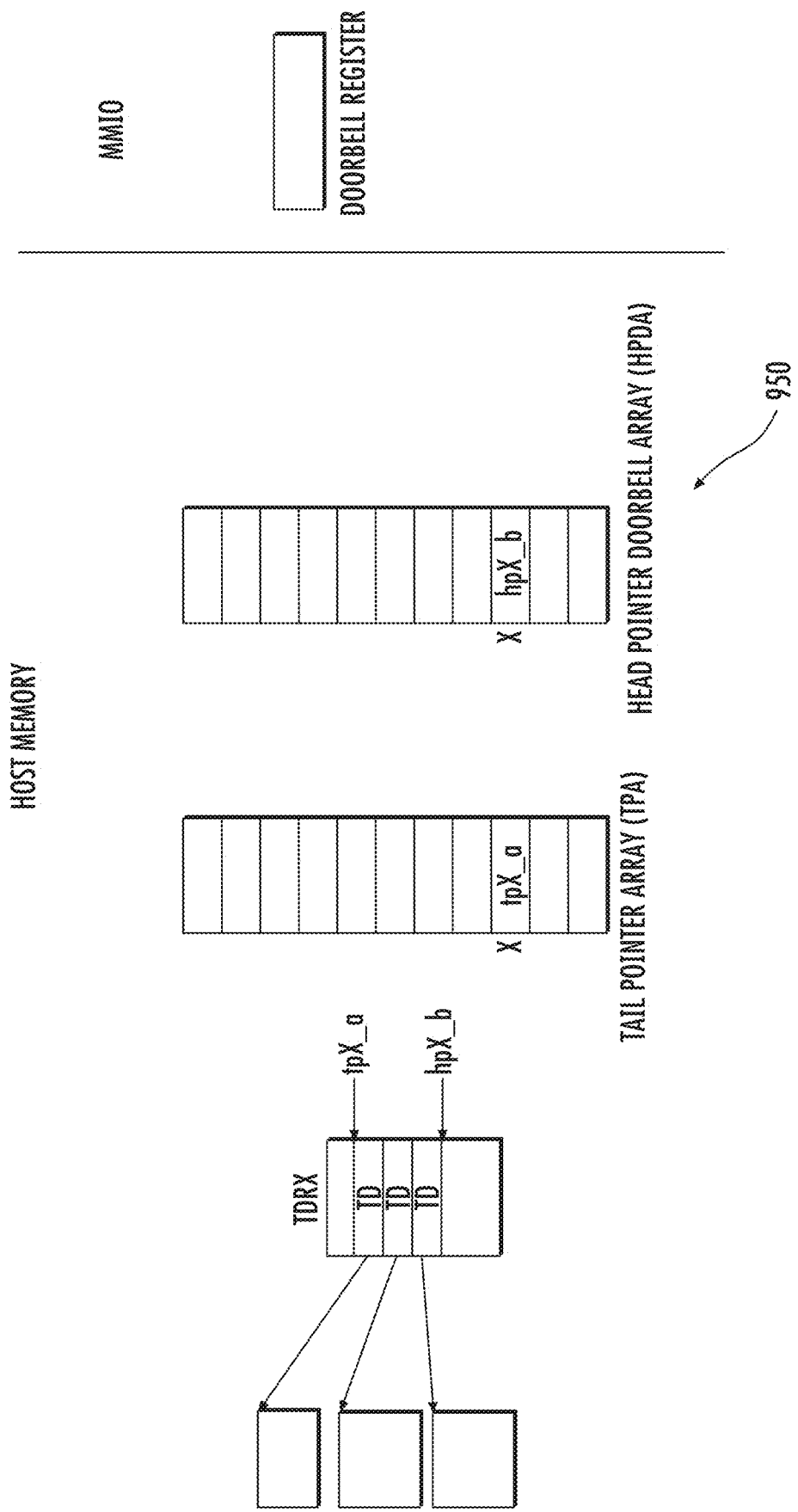
Figure 10:
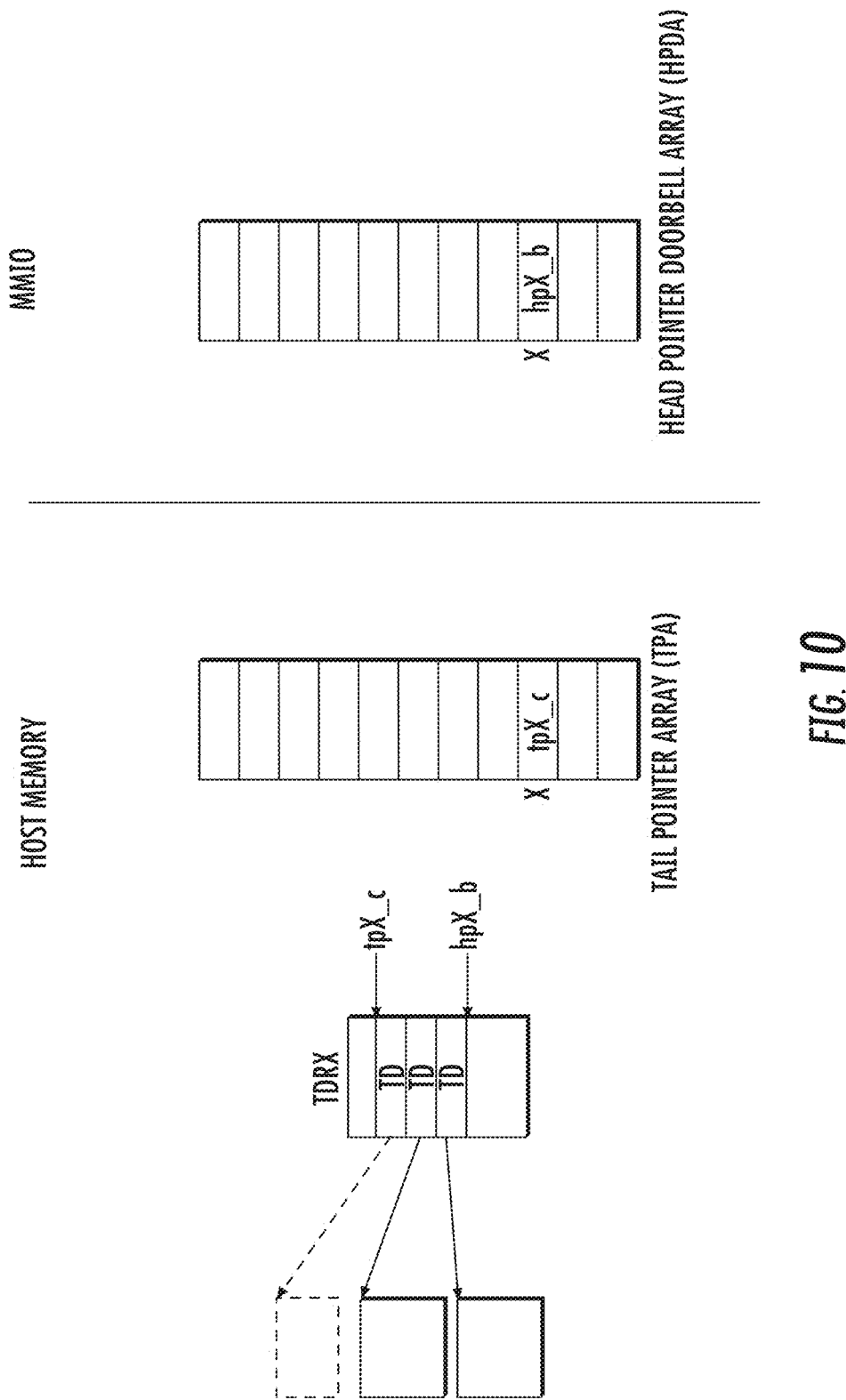
Figure 10A:
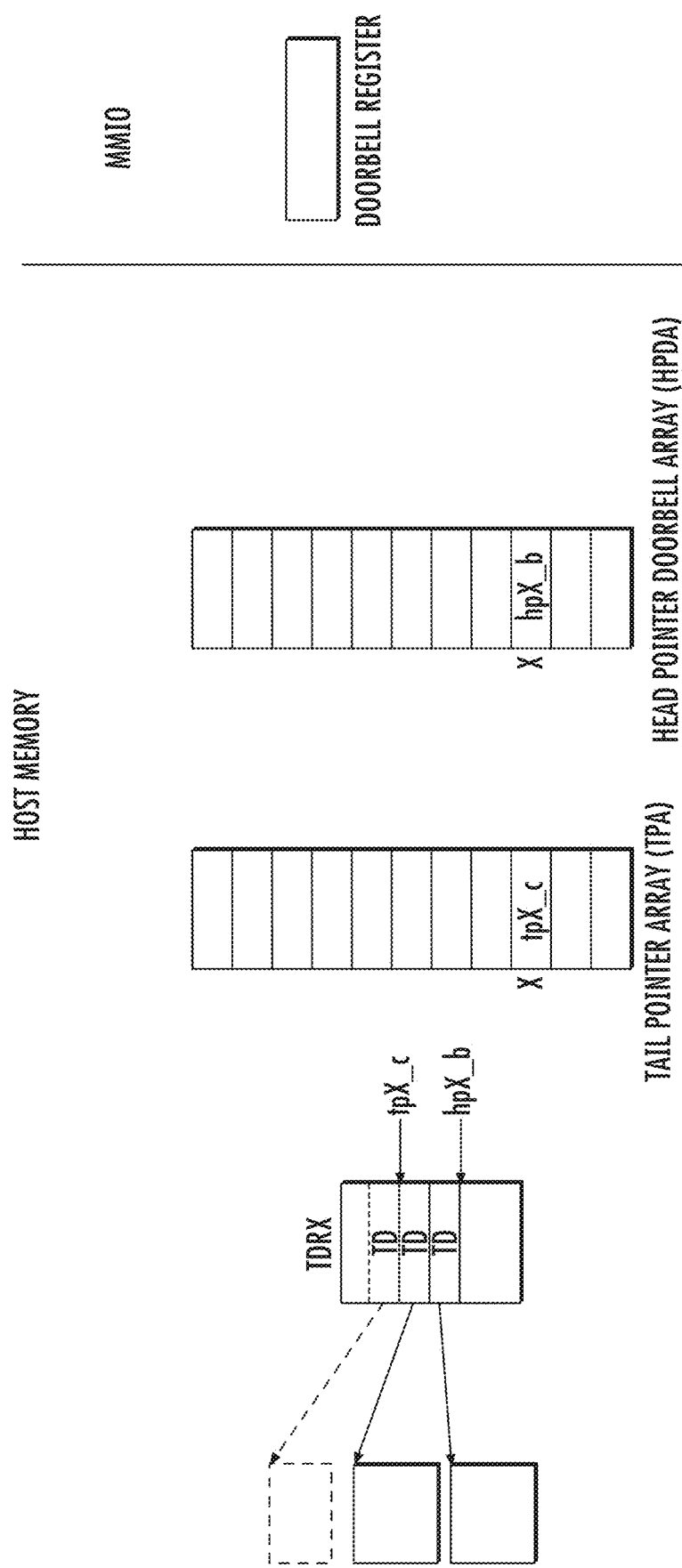
Figure 11:
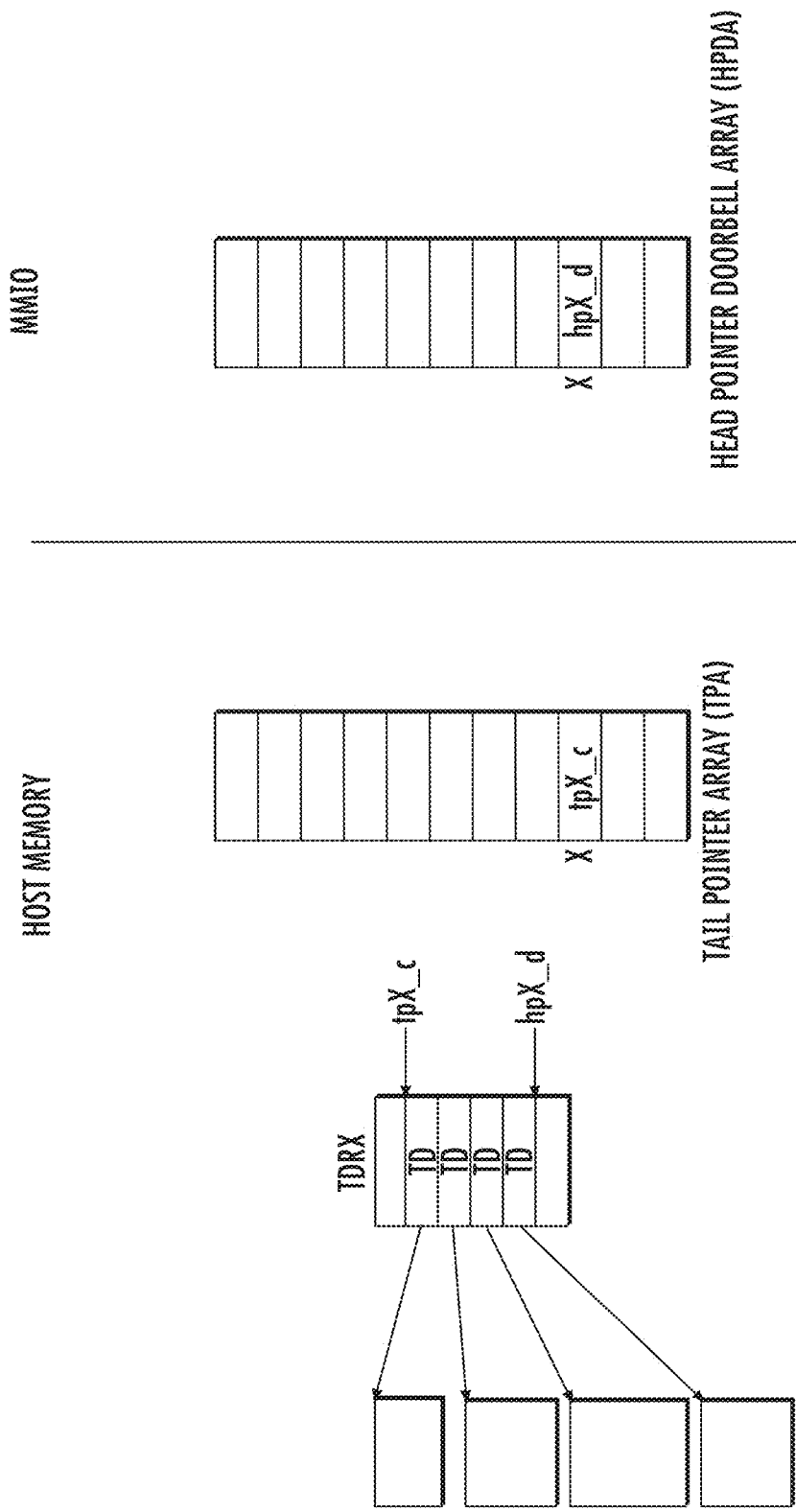
Figure 11A:
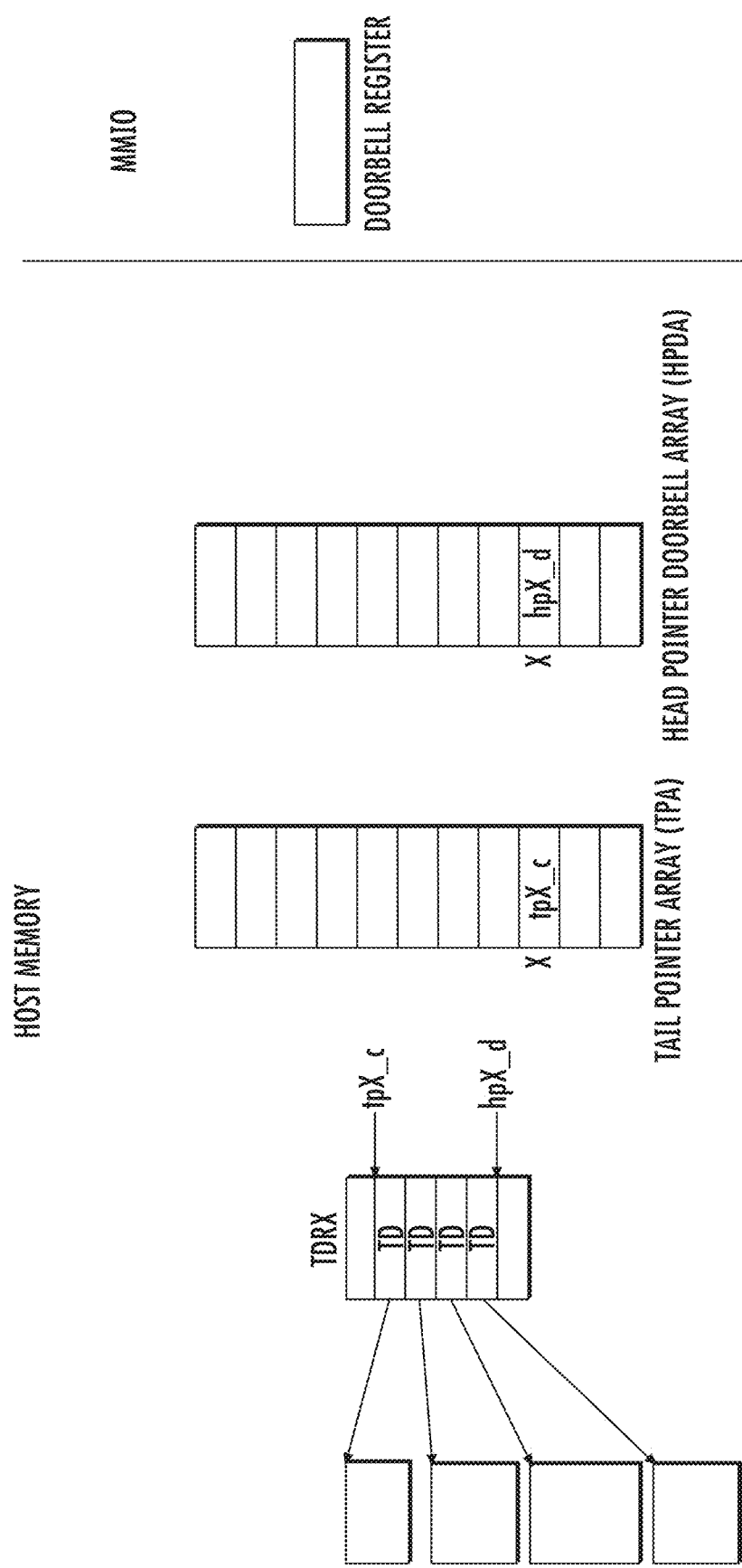

FIGS. 9-11 illustrate exemplary TDR (TDRX) transactions which support a "pipe" (pipeX, where X is the pipe number). As shown in FIG. 9, the TDR can contain multiple TDs, and the TDR state is described by the values of head pointer and tail pointer. The head pointer (hpX_b) points to the next empty slot in TDRX, and the tail pointer (tpX_a) points to the current location in TDRX (i.e., the location the peripheral will process next). As previously noted, when the head pointer equals the tail pointer, the ring is empty. Any TD between the tail pointer and head pointer is controlled by the peripheral processor; while the following scheme is based on a mutually exclusive control (i.e., when the host controls a memory, the peripheral cannot write to the memory and vice versa), those of ordinary skill in the related arts, given the contents of the present disclosure, will readily appreciate that other forms of shared access may be substituted with equal success. As previously noted, the head and tail pointers can be exchanged between host and peripheral processors via the TPA and HPDA data structures of the MMIO.

FIG. 10 depicts the exemplary TDR after the peripheral processor has completed processing a TD. Specifically, as shown, once the peripheral processor has completed a TD, it updates the TD and the TPA with the address of the next TD to be processed, followed by a generation of an MSI. Responsive to the MSI, the host processor frees the TD and indicates successful completion to the client service.

FIG. 11 depicts the exemplary TDR queuing additional TDs for subsequent processing. As shown, when the host processor queues a new buffer, it checks whether there is an entry available in the TDR. Where there is an entry, the host processor populates the TD at the address pointed to by the head pointer, and then the head pointer value is updated. Thereafter the host processor updates the HPDA with the new head pointer value, which notifies the peripheral processor of the change.

FIGS. 9A-11A illustrate exemplary TDR (TDRX) transactions in the context of the architecture of FIG. 7A (i.e., doorbell register in MMIO) discussed above.

Figure 12:
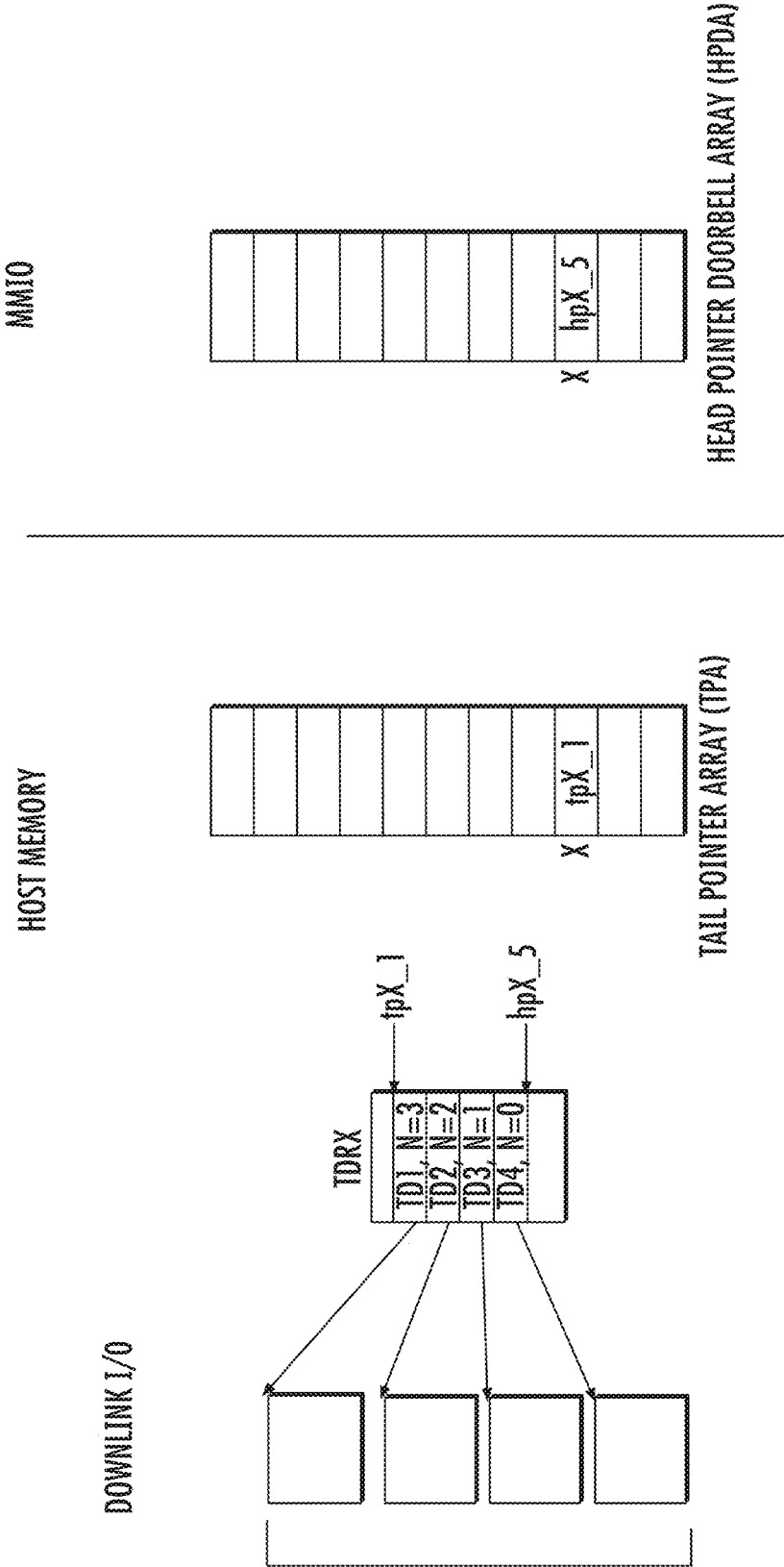
FIGS. 12-13 are logical representations of one exemplary transfer descriptor ring (TD) illustrating over-buffering and termination prior to completion, in accordance with the principles described herein.
Figure 13:
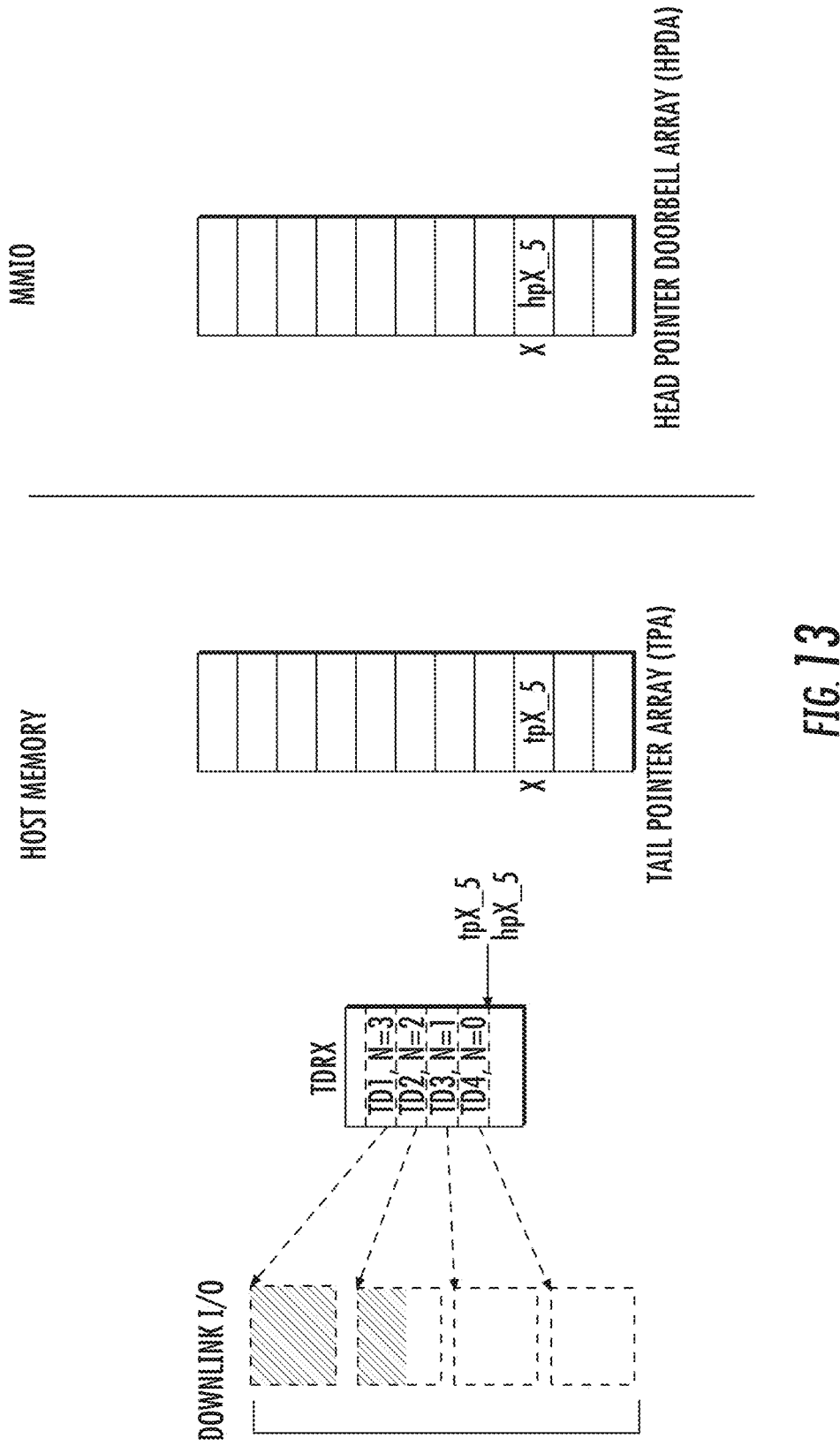

Referring now to FIGS. 12 and 13, there may be special considerations for downlink transfers.

As previously noted, in the exemplary embodiment, when a host processor queues a TD for a downlink transfer in a TDR, the size field indicates the expected size of the buffer queued. On completion, the peripheral processor overwrites this value with the actual number of bytes written in the buffer. In some cases, the host processor may not know in advance the amount of data which will be sent by the peripheral processor. In some designs, the host processor may queue a large buffer out of an abundance of caution (e.g., to prevent a buffer overrun). For such implementations, the host processor may additionally queue a number of such large buffers in memory. See FIG. 12.

In some cases, the I/O transfer may be terminated prior to completion (presumably consuming fewer of the TDs than were queued for the transfer). In these scenarios, the peripheral processor generates the end transfer completion for the TD irrespective of the Next count (ignoring the remaining buffers). In such cases, the host processor will reap all of the TDs from the TDR (including the extraneous TDs). See FIG. 13.

In the foregoing embodiments, the TDR is valid while the pipe is open. Pipes can be opened or closed based on appropriate messaging. For example, in one such implementation, an Open Message provides the address of the TDR and its size, whereas a Close Message completion may "reap" the TDR (e.g., enabling the data to be overwritten or allocated to other purposes, etc.). When a pipe is not open, its corresponding values within the TPA and HPDA are not relevant (or otherwise disregarded).

In one aspect, the host processor controls the state of the pipe via a messaging data structure. In one exemplary embodiment, the messaging data structure is queued according to a message ring (MR), which operates in a manner similar to the aforementioned TDR. Specifically, the MR is described by a message tail pointer (MTP), a message head pointer (MHP), and a message head pointer doorbell (MHPD). When initializing the IPC state machine, the processor configures the MR, and sets the MR base address in the MTP, and update context information which is configured to cause the peripheral processor to read the MR base address in the MHPD and transition the Run Time IPC State Machine of FIG. 6 to the Running State 606. Thereafter, the host can transact messages with the peripheral processor.

During run time operation, every time the host has a new message to send, it checks whether there is space in the MR for a message request. If so, a new message entry is created at the MHP and the head pointer value is updated. The new head pointer value is written to the MHPD. When the peripheral processor has consumed the message, it updates the status of the message and then updates the MTP. Additionally, the peripheral processor sends an MSI.

Various other modifications and/or permutations of the TD, TDR, and MR data structures and transactions may be made by one of ordinary skill, given the contents of the present disclosure.

Exemplary Power Management Scheme

As a brief aside, existing PCIe implementations support a so-called "standby" or "sleep" mode. However, existing PCIe sleep mode operation was designed for personal computer implementations which have sleep states that are less involved than techniques used in e.g., typical cellular phone devices, etc. Accordingly, existing PCIe specifications mandate an exit latency that is much shorter than the actual exit latency that most cellular devices can support (an unresponsive peripheral processor would cause the host fabric to hang). In view of the limitations of existing PCIe implementations, the disclosed IPC enabled host and peripheral processors independently track sleep mode operation so that the shared memory interface (MMIO) can be "gated off" during sleep mode operation until the sleeping processor wakes up.

In one embodiment, the computer readable instructions, when executed by at least one of the first or second processors (102A, 102B) is configured to perform power management. In one exemplary embodiment, power management between the two independent processors is configured according to a sleep message. One such sleep message contains: a target field that indicates which processor (e.g., host or peripheral) the message is directed to, a state field that triggers the appropriate processor state machine to enter or exit a sleep mode, a type field which identifies the message type, and a completion status field which indicates whether the sleep message is succeeded or failed.

In one exemplary embodiment, two (2) registers control the peripheral processor sleep state machine: Peripheral Sleep Notification (in the host memory) and Peripheral Sleep Control (in the peripheral processor memory). Peripheral Sleep Notification is written by the peripheral processor to indicate whether the device is active or sleeping. The peripheral processor notifies the host processor (via e.g., an MSI) after updating this register. Peripheral Sleep Control sits in the peripheral processor MMIO space and is updated by the host to indicate active mode, sleep mode, and wake mode. An interrupt is triggered when the host updates the Peripheral Sleep Control register.

In one exemplary embodiment, the peripheral initiates entry to sleep mode autonomously (without host assistance). In other embodiments, the peripheral may be gated by the host processor, or be otherwise conditionally limited as to initiating sleep mode operation. In one such case, the peripheral processor triggers sleep mode operation when: there is a very high probability that it will enter sleep, the sleep state machine is in the active mode, and the host has not asserted device wake. The peripheral processor may trigger wake operation when: the sleep state machine is in sleep mode, and the peripheral processor device requires the communications link for communication, or the host requires the peripheral processor to wake-up (indicated via a device wake assertion).

FIG. 14 illustrates the independent state machines within each processor which support a peripheral processor initiated sleep. In some embodiments, wake-up procedures can be initiated by using an out-of-band GPIO (which triggers wake) in other embodiments, wake-up procedures can be triggered via a dedicated in-band MMIO doorbell.

In order to go to sleep, the peripheral processor can send a sleep mode request in the Active State via the Peripheral Sleep Notification register, and enter the Sleep_Wait State. When in Sleep_Wait State, the peripheral processor is quiescent and does not initiate or complete any data transfers or messages. The peripheral processor monitors the Peripheral Sleep Control register for host action.

When the host detects the sleep mode request, the host processor updates the Peripheral Sleep Control register to Sleep Mode and enters the Sleep State. The peripheral processor detects the update in the Peripheral Sleep Control register and enters the Sleep State.

In the Sleep State, the peripheral processor checks whether the host processor has any pending transfers or messages in flight. If so, then the peripheral processor initiates the "wake-up" process to transition to the Active State. Similarly, if the peripheral processor needs to access the communication link, then it will wake-up.

In order to wake-up, the peripheral processor sends an Active Mode request via the Peripheral Sleep Notification register and enters the Active Wait State. The peripheral processor can thereafter immediately access the communications link for data transfer and messages, however (in order to prevent a state machine race condition) the peripheral processor cannot enter sleep or send a Sleep Mode request.

Responsive to the Active Mode request, the host updates the Peripheral Sleep Control register to Active Mode and enters the Active State. The peripheral processor enters the Active State when it sees the host's update in the Peripheral Sleep Control register.

The host initiated sleep process is similar. When the host is ready to enter sleep, it informs the peripheral processor via a Host Enter Sleep Message. Upon seeing the Host Enter Sleep Message, the peripheral processor suspends its own sleep state machine, and processes all pending TDs.

Responsive to the Sleep Message completion, the host may transition to sleep mode; thereafter, the peripheral processor may also independently enter sleep mode. If the peripheral processor needs to reestablish communication with host, it can request the host to wake-up via e.g., an out-of-band GPIO (which triggers wake). Once the host has woken, the host updates the peripheral with a Host Exit Sleep Message.

Referring back to the peripheral processor, once the peripheral processor TDR processing is complete, the peripheral processor transmits a complete/acknowledge response to the Sleep Message. Thereafter the peripheral processor will not accept any more TDRs until it receives a Host Exit Sleep Message from the host processor (received via a Message Ring (MR)). The peripheral will acknowledge/complete the Host Exit Sleep Message before resuming data transfers.

Exemplary Error Recovery

In one embodiment, the computer readable instructions, when executed by at least one of the first or second processors (102A, 102B) is configured to handle and/or recover when the other processor experiences an error.

Figure 15:
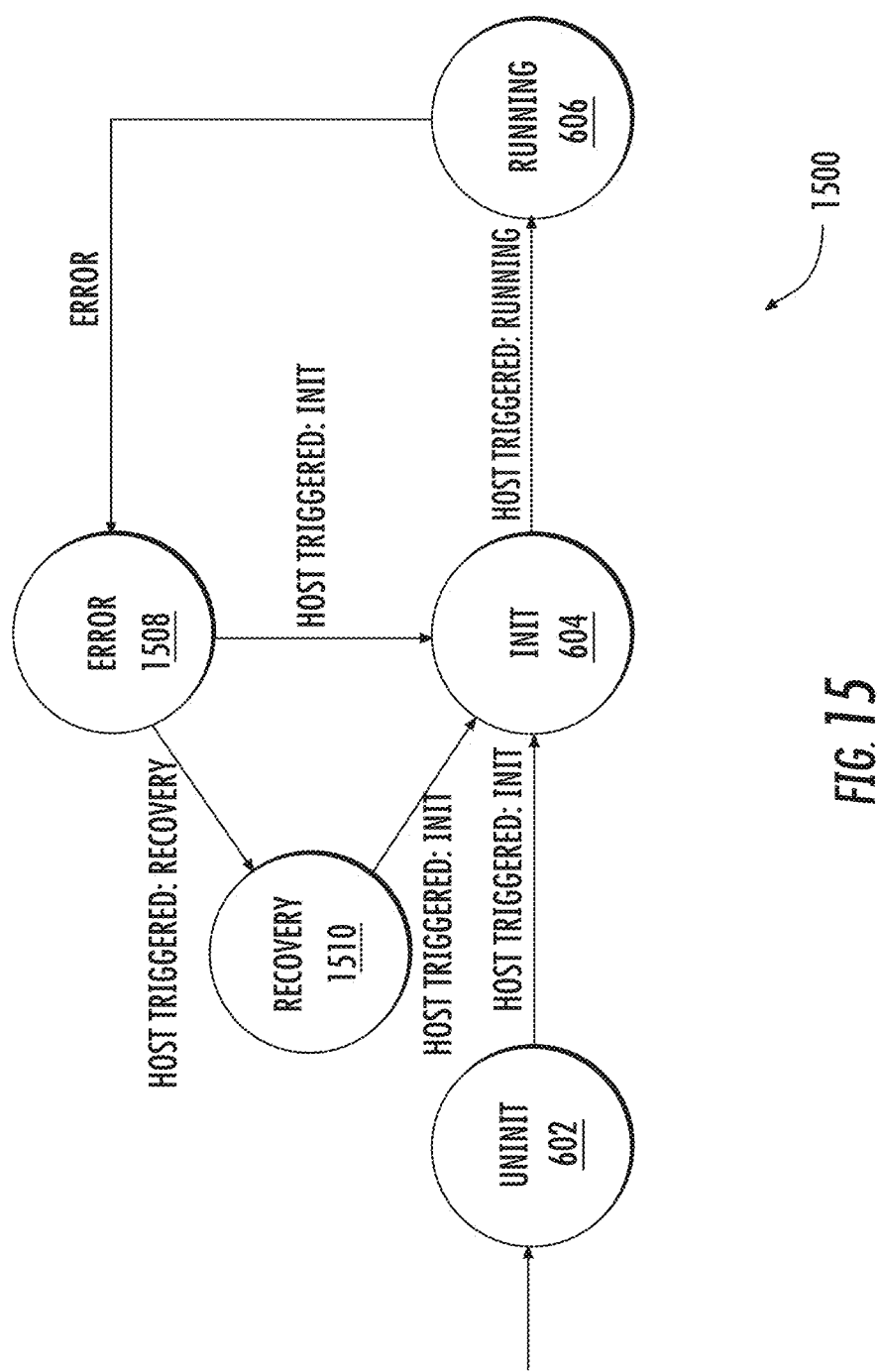
FIG. 15 is a logical block diagram of an exemplary run time operation state machine which supports error recovery, useful in conjunction with the various described embodiments.

As shown in FIG. 15, some embodiments 1500 may incorporate an Error Recovery state 1510. Specifically, for any error detected in the Run IPC Protocol (which operates similar to the features described with reference to FIG. 6), the IPC state machine moves to the Error State 1508. Thereafter, the host processor may trigger an error recovery procedure by transitioning to the Recovery State 1510. In one embodiment, the peripheral processor includes an error recovery handler which collects last known state and/or protocol information. This recovery information can be used to "rollback" the transactions to the most recent recoverable state, thereby allowing the transaction to gracefully exit (or continue). Certain types of ongoing data transfer errors can be detected via hardware/software mechanisms like DMA completion error, polling link state, etc.

In one exemplary embodiment, the host triggers transition to the Recovery State 1510 by writing Recovery to the IPC Control register. Responsively, the peripheral processor collects the reliable tail pointers for all reliable pipes (pipes which were initialized with reliability flags), and updates the Head Pointer Doorbell Array entry with these reliable tail pointer values. The remaining entries in the Head Pointer Doorbell Array are set to zero. The peripheral processor updates the IPC Status to Recovery and sends a notification MSI to the host.

When the host receives the notification, it checks the IPC Status Register to detect change to Recovery State 1510; in the Recovery State, the host executes an appropriate Recovery Protocol to recover any trapped debugging information. Thereafter, the host and the peripheral processor re-initialize the link and appropriate data structures.

Methods

Figure 16:
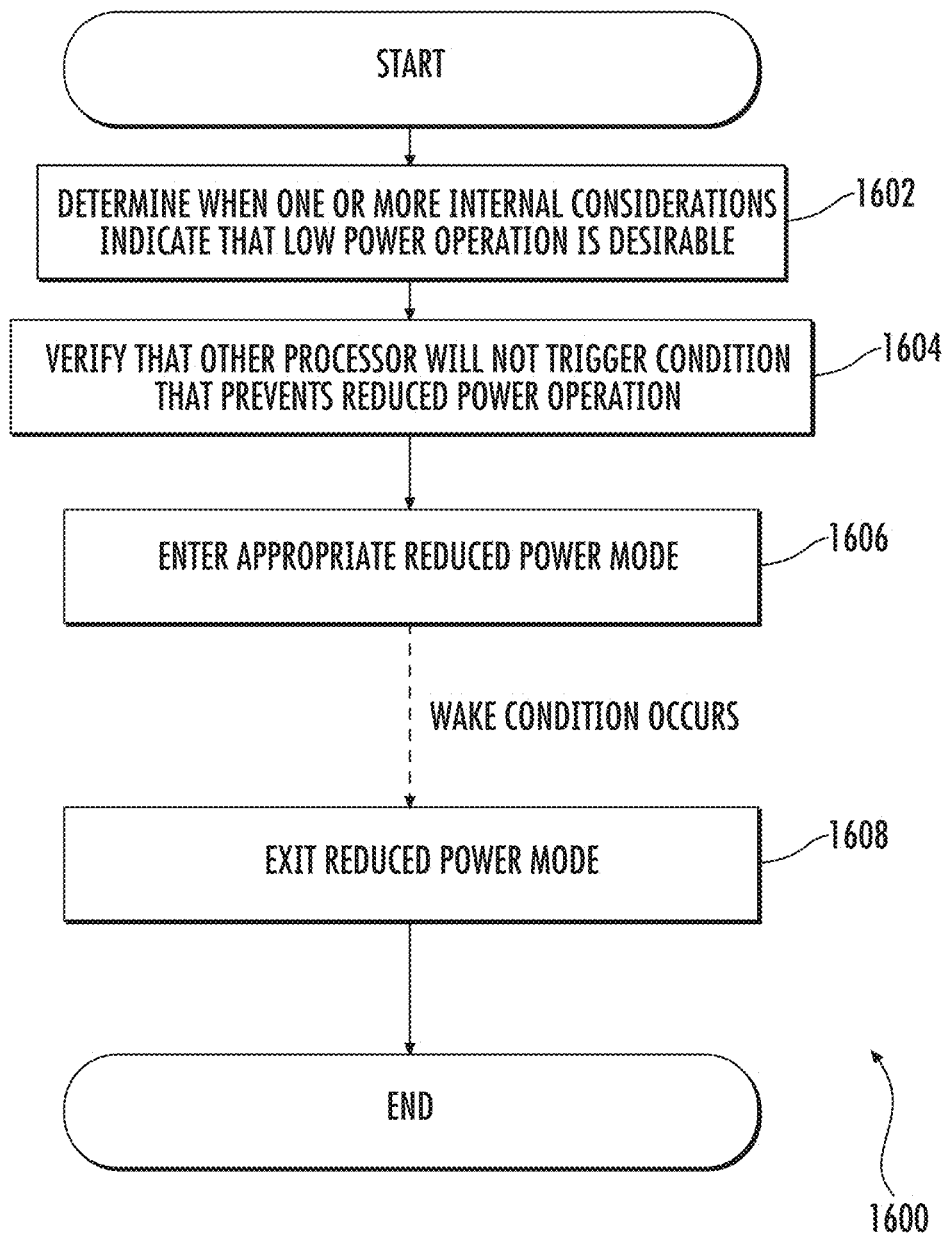
FIG. 16 is a logical flow diagram illustrating an exemplary generalized power management process for independently operable processors, in accordance with the present disclosure.

FIG. 16 is a logical flow diagram illustrating an exemplary embodiment of a generalized power management method 1600 for independently operable processors.

As a brief aside, processor power consumption is affected by a plethora of factors such as memory use, voltage, clock frequency, etc. Metrics for power consumption typically incorporate computational efficacy; for example, in the computing arts, performance can be benchmarked as number of compute cycles per watt consumed. Accordingly, in various described embodiments, when the relative processing performance is low relative to the amount of power consumed (or based on other considerations), the processor will prefer to operate in lower power states. Within this context, artisans of ordinary skill, given the contents of the present disclosure, will readily appreciate that there are a plethora of actions and/or transactions which can be initiated by another processor which require action on the part of the processor. More directly, the present disclosure recognizes that the processor must consider one or more other processor activities in order to properly assess the optimal power strategy. Thus, the processor's determined preference for low power operation must in many cases be balanced against the considerations of the system as a whole.

At step 1602 of the method 1600, a processor determines when one or more internal considerations indicate that low power operation may be desirable. In one exemplary embodiment, the processor monitors its current processing load; when the processing load falls below a minimum threshold, the processor flags an opportunity to reduce power consumption.

More complex embodiments may incorporate multiple processor-specific factors; for example, such factors may include e.g., the processor's state machine, historic processing burden, anticipated processing burden, etc. Historic processing burden and/or anticipated processing burden may be based for example on an analysis of a histogram of processing activity, and/or software execution which correlates with power consumption. For instance, the presence of a pending data transfer (e.g., a DMA access) may indicate that the processor should pre-emptively prepare for active mode operation. Similarly, the presence of a cache miss may signal that the processor has an opportunity to sleep while data is fetched from less accessible memory (e.g., a disk drive, etc.).

Those of ordinary skill in the related arts will readily appreciate that certain applications may be adversely affected by performance losses that are attributable to excessive power optimization. Similarly, some users prefer performance over power consumption, or vice versa. Still further, some manufacturers prefer to ensure a minimum performance or maximum power consumption so as to provide a certain product experience to consumers. Accordingly, certain embodiments of the present disclosure may additionally prioritize processor performance and/or power consumption against other considerations (e.g., user experience, latency, etc.). In some cases, priorities may be dynamically evaluated and even altered.

In some implementations of the present disclosure, one or more relevant parameters are stored via dedicated hardware registers and/or hardware logic, etc. For example, user preferences and/or manufacturer preferences may be stored within dedicated non-architectural registers and/or configured within logic. In other examples, the relevant parameters may be stored within memory (e.g., BIOS), or otherwise virtualized. For example, a state machine may be implemented as a virtualized machine (e.g., the states, inputs, outputs, etc. are stored within memory). In some cases, the relevant parameters are stored via a memory mapped memory space such that other processors may freely access the processors parameters (for the other processor's own consideration, as discussed infra). Common examples of relevant parameters may include for example, processing metrics, historic processing burden, indicia of predicted load, etc.

At step 1604 of the method 1600, the processor verifies that another processor(s) has not and/or will not trigger a condition that prevents reduced power operation. As previously noted, transactions via the inter-processor communications link can result in a wake event. More generally, the processor should remain in an active power state whenever the other processor has a high probability of issuing a request which must be serviced by the processor.

In one exemplary case, a peripheral processor may check that a host processor has issued or is likely to issue device wake signaling. In this scenario, device wake signaling indicates a forthcoming data stream transfer via the inter-processor communication link; the device wake signaling allows the host and peripheral processors to minimize the amount of time necessary to transact the data stream. If the device wake signaling is present, then the peripheral processor will remain in/transition to the active state, otherwise the peripheral processor may transition to a lower state mode.

In some cases, a peripheral processor may check the power state of another processor to determine whether the other processor is active and/or in a state that would require the peripheral processor to remain in its current state. For example, where a host processor is sleeping, the peripheral processor may reasonably enter/exit sleep based on its own considerations; in contrast, where a host processor is active and under heavy processing load, the peripheral processor may prefer to remain in an active state in anticipation of future transactions.

In some embodiments of the present disclosure, the processor retrieves one or more relevant parameters associated with another processor that are stored via dedicated hardware registers, hardware logic, memory mapped memory space, etc. Based on the one or more relevant parameters, the processor can determine the current state and/or predict the future activity of the other processor. In this manner, the processor can intelligently determine when to transition into/out of lower power states.

In still other embodiments, the processor may infer the likelihood of future traffic based on the other processor's activity type. For example, a peripheral processor that provides baseband modem functionality can infer that the applications processor is likely to request data when the user is surfing the Internet, browsing webpage content, drafting a text message, etc. Similarly, a baseband modem can infer that the applications processor is unlikely to request data where the user is enjoying locally stored music or video content, etc. Where traffic is unlikely, the processor can safely transition into lower power states.

In some implementations, a system of processors may incorporate a power controller which tracks the power state of each of the processors of the system (as well as other potentially relevant considerations, such as thermal design power (TDP) margin or the like). In these centralized power controller systems, the processor may be able to determine the current power state of each of the other processors by reading the contents of the power controller. For example, in one such exemplary embodiment, the power controller is mapped to a dedicated portion of the memory map.

In one implementation, based on the foregoing considerations of (i) the processor's load, and (ii) the other processor's current and/or anticipated traffic, the processor determines whether a reduced power mode is appropriate and if so, enters the appropriate reduced power mode (step 1606).

In some embodiments, the processor must receive an acknowledgement or instruction before it can transition to the reduced power mode. In one such variant, the host processor (or other power controlling entity) uses a sleep message to control sleep of the host and peripheral processor. An exemplary sleep message may include, without limitation: a target that indicates which processor the message is targeting, a state that identifies the reduced power mode (e.g., active or sleep state), and/or a type that is used to uniquely identify the message. In some cases, the peripheral processor may additionally respond with a sleep response message that includes a status to indicate success or failure.

For example, where the host processor transmits a sleep message to the peripheral processor having the target field set to the peripheral processor, then the peripheral processor will responsively enter or exit sleep mode in accordance with the sleep message. Where the host processor transmits a sleep message to the peripheral processor having the target field set to the host processor, then the peripheral processor may accept the information as merely information with regard to the host processor's current state.

In related embodiments, the processor additionally notifies the other processor(s) of its reduced power mode. In one exemplary implementation, the notification includes writing to a location in a shared memory mapped interface and issuing an interrupt that indicates the status update. In other implementations, the notification may be implemented via register writes, dedicated signaling, interrupt signaling, out-of-band signaling, etc. Still other implementations may not notify the other processor; the other processor(s) may infer the status of the reduced power processor, or alternatively query the reduced power processor state (via a polling process, etc.) In systems with a centralized power controller, the processor may provide its power state information to the power controller; subsequently thereafter, other processors can determine the state of the processor by querying the power controller. Still other schemes will be readily appreciated by those of ordinary skill in the related arts, given the contents of the present disclosure.

In an exemplary embodiment, the processor's state is controlled by a state machine having at least one sleep state, and at least one active state such as shown in FIG. 14, described supra. While the illustrated state machine of FIG. 14 provides an active state and a reduced power state (and two transitionary states), it is appreciated that the various aspects of the present disclosure are readily applicable to more complex schemes which may include multiple power states having different associated power consumptions, capabilities, and/or performances associated therewith, etc. Common examples of reduced power states include without limitation, states that reduce the voltage and/or frequency of signaling and/or clocks, states that selectively enable or disable circuitry, states that selectively enable or disable interfaces, etc.

In an exemplary embodiment, the reduced power notification may include additional information to assist other processors in maximizing performance. Common examples of such information includes without limitation: a minimum or maximum sleep time, an indication of the reduced power state (where there are multiple states), an indication of the wake-up latency, a starting time stamp, etc. For instance, before waking up the peripheral processor, the host processor may evaluate the amount of time that has elapsed since the peripheral processor has powered down (longer sleep times represent more power savings). Moreover, for non-urgent traffic, the host processor may buffer time=insensitive data before waking the peripheral processor. Still further, the host processor can consider the wake-up latency so as to start the wake process with enough lead time to minimize overall performance impact for time critical transactions. Various other optimizations may be substituted with equal success, such other optimizations recognized by those of ordinary skill given the contents of the present disclosure.

While the foregoing examples are provided within the context of a processor, it is readily appreciated by those of ordinary skill in the related arts that the various aspects of the present disclosure may be offloaded or assisted by dedicated power management circuitry. For example, in one such exemplary embodiment, a peripheral processor may interface with a device power controller that considers the various considerations of the processor, other processors, and other external factors, to optimize power for the device. Common examples of such external factors include without limitation e.g., charger status, total power consumption, remaining battery power, TDP, etc.

In some cases, since the processors do not directly control their power state, the processors may individually issue "votes" for sleep mode operation. The device power controller can collate the votes and, based on the votes, configure sleep modes for the individual processors, sets of processors, and/or the entire device. Common examples of voting schemes include, without limitation, simple majority, super majority, weighted majority, etc. In some cases, the power controller may additionally have certain limitations over operation (e.g., the capability to override the voting majority, etc.)

Thereafter, when one or more wake conditions occur, the processor exits the reduced power mode and sends a wake notification (step 1608).

In some embodiments, the wake condition occurs when there are pending transfers or transfers "in flight" (i.e., transfers that have already been initiated). Under such circumstances, the processor will initiate a transition to an active state to service the transfer. In other embodiments, the wake condition occurs according to one or more of the processor's own tasks. For example, in many wireless technologies, the modem must periodically wake-up to check-in with e.g., a cellular base station, wireless access point, etc. In still other embodiments, the processor may automatically wake on the expiration of a timer, etc.

In one embodiment of the present disclosure, wake-up procedures may be implemented according to an out-of-band process. During an out-of-band wake scheme, the host uses separate signaling (e.g., a separate general purpose input/output (GPIO)) to instruct the peripheral device to exit sleep mode. Responsive to the out-of-band signaling, the peripheral device exits its sleep mode, and also prevents any further requests by the peripheral device to enter sleep.

In certain "race condition" situations, the host asserts device wake at the same time the peripheral device requests Sleep Mode with a sleep notification. Under these circumstances, neither the host nor the peripheral can initiate or complete any data transfers or messages over e.g., PCIe. Accordingly, in one such variant, the host transitions the sleep state machine to sleep mode, whereupon the peripheral immediately sends an active mode request to cause the host to update the sleep state machine back to active mode. In this manner, the host can initiate data transfer via the communications link. While the foregoing race condition is resolved based on host prioritization, it is readily appreciated that race conditions could also be resolved by other mechanisms, such as for example prioritizing the peripheral device.

Figure 17:
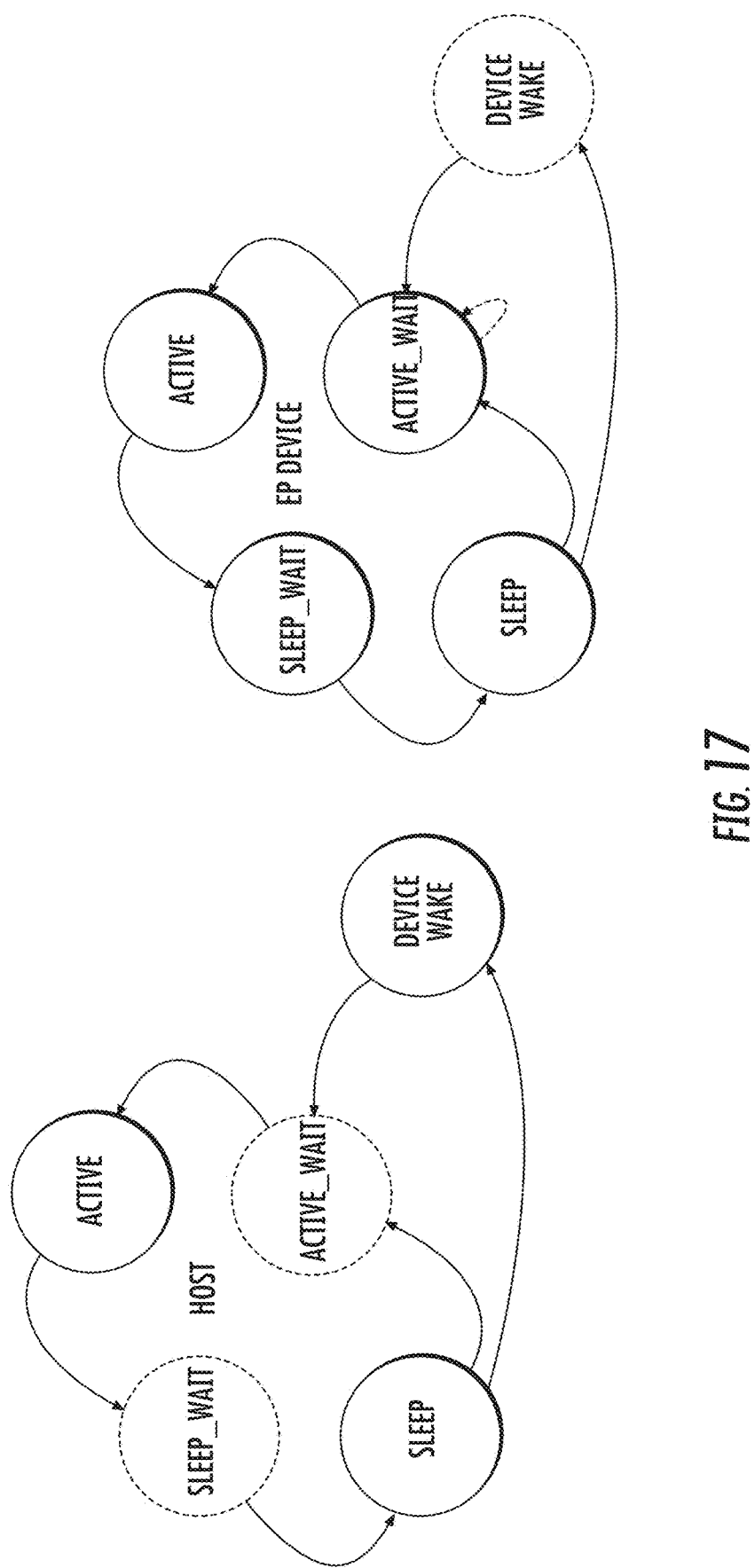
FIG. 17 is a logical block diagram of exemplary independent state machines within each processor which support in-band device wake operation, useful in conjunction with the various described embodiments.

In other embodiments, wake-up procedures may be implemented according to an in-band device wake scheme. FIG. 17 is a logical block diagram of one implementation of independent state machines within each processor which support in-band device wake. The state machine of FIG. 17 includes the four (4) states of FIG. 14, and additionally incorporates a Device_Wake state that allows the host to initiate the peripheral's transition to the Active_Wait state. This is contrasted with direct transitions from Sleep to Active_Wait that the peripheral controls. Specifically, in one exemplary embodiment, the host triggers device wake by writing a state machine register (e.g., a device wake register) rather than out-of-band signaling. The state machine register is de-asserted when the peripheral transitions to Active.

For illustration, one exemplary in-band wake process proceeds as follows: when the host needs to access the peripheral (in Sleep) via the communication link, the host processor writes to the device wake register and transitions to the Device_Wake state. The peripheral device on seeing the Device Wake updates a device sleep notification register to Active and enters the Active_Wait state; in the Active_Wait state, the peripheral can access the communication link for data transfers and messaging. As illustrated in FIG. 17, the peripheral device cannot enter sleep or send sleep mode requests. Responsive to the host detecting that the peripheral has transitioned to the Active mode (e.g., by reading the sleep notification register), the peripheral updates the device wake register and enters the Active state. Once the host has transitioned, the peripheral device shall see the update in the Device Sleep Control register and enter the Active state as well.

As previously noted, there may be situations where a race condition occurs between the events of the host asserting device wake at the same time as the peripheral device requesting Active mode via the sleep notification register. Under these very limited circumstances, the host's state machine remains in Active wait and proceeds as described supra.

Figure 18:
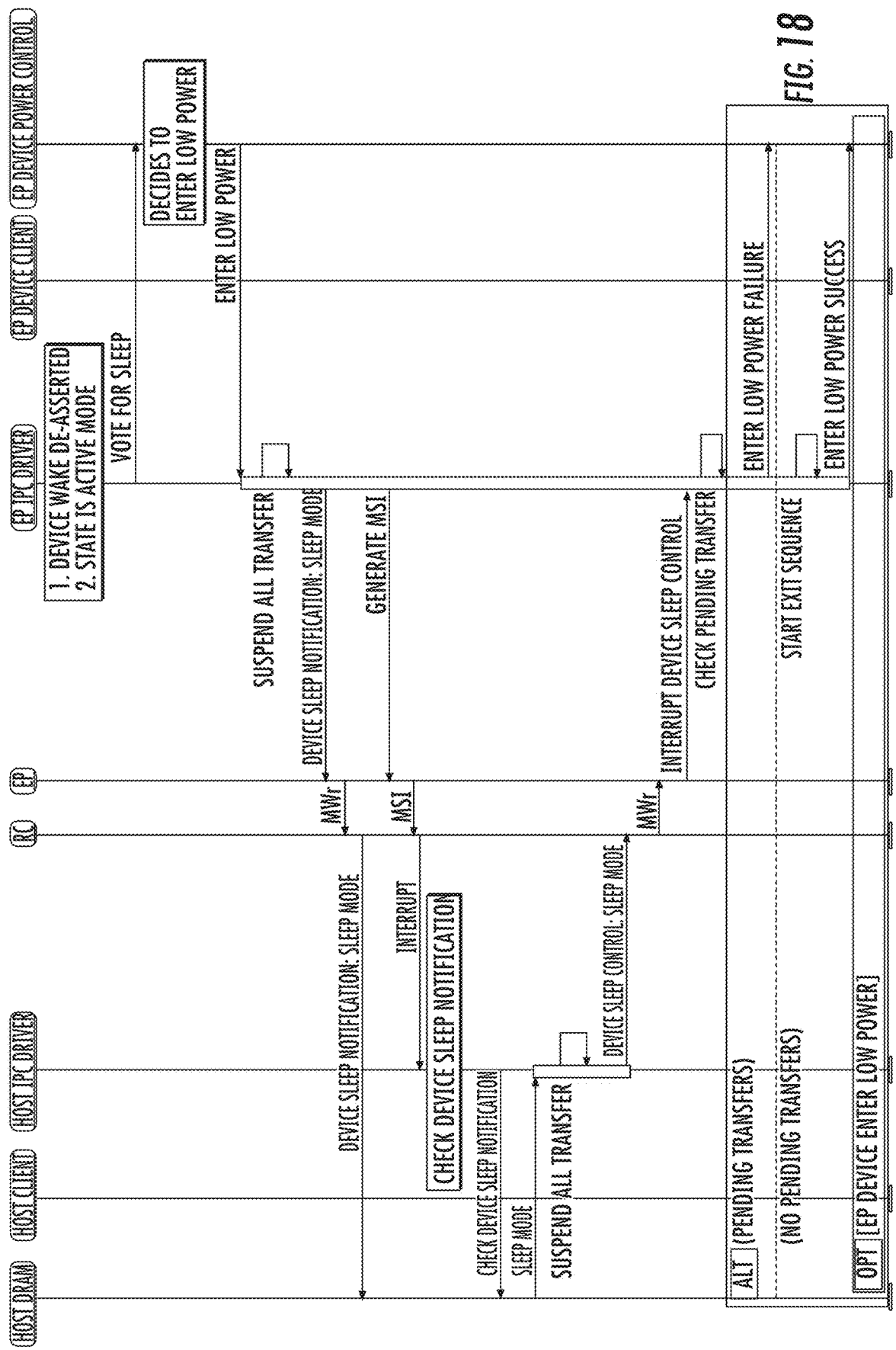
FIG. 18 is a software ladder diagram illustrating transactions for entering a sleep state, in accordance with one implementation of the present disclosure.

FIG. 18 is a software ladder diagram illustrating transactions for entering a sleep state, in accordance with one implementation of the present disclosure. As shown therein, the EP processor's inter-processor link driver "votes" to reduce power. When the power controller grants the sleep request, all transfers are suspended in the EP and the sleep notification is provided via MSI and interrupt to the RC (which responsively suspends all transfers).

Figure 19:
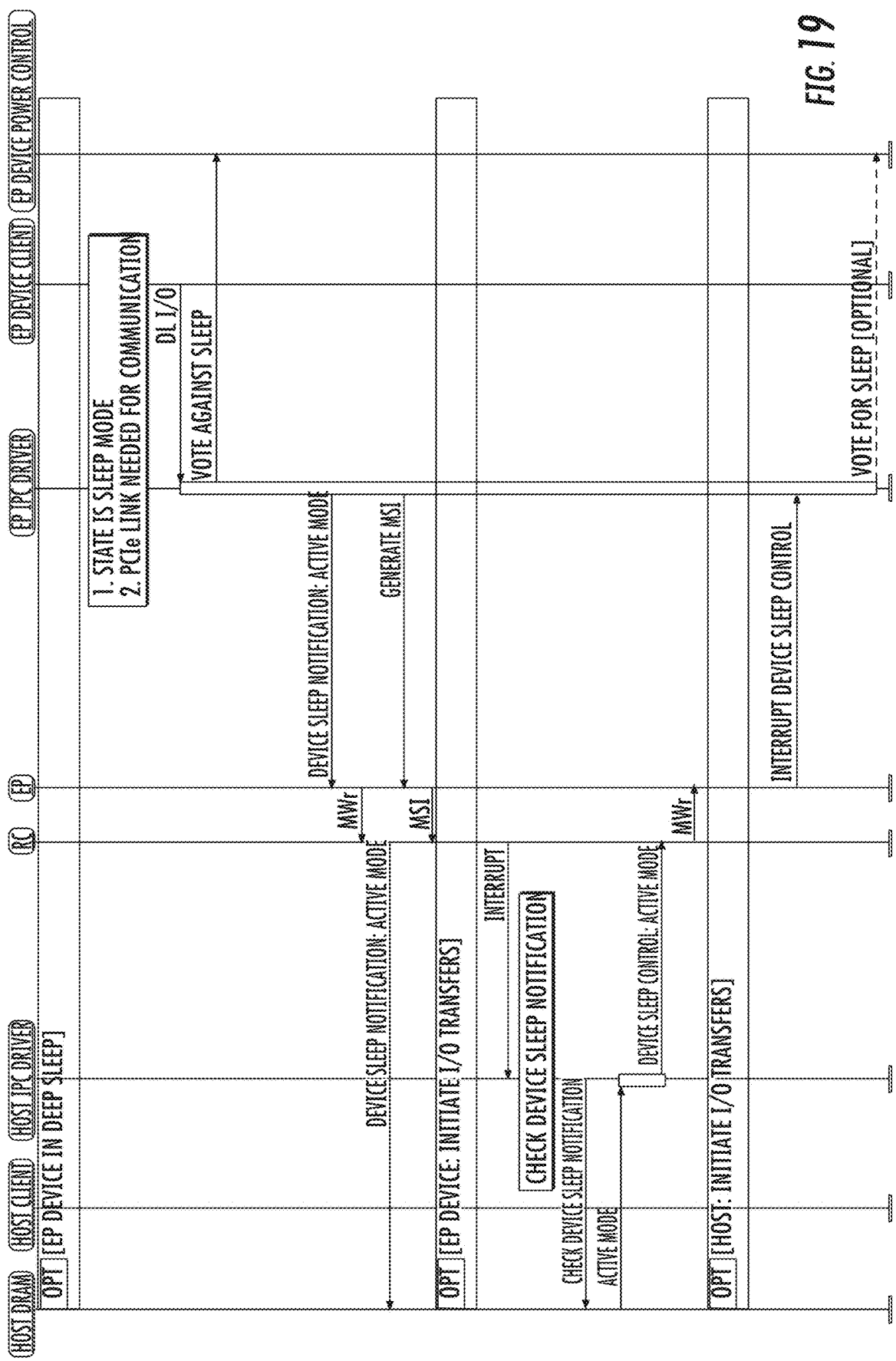
FIG. 19 is a software ladder diagram illustrating transactions for exiting a sleep state, in accordance with one implementation of the present disclosure.
Figure 20:
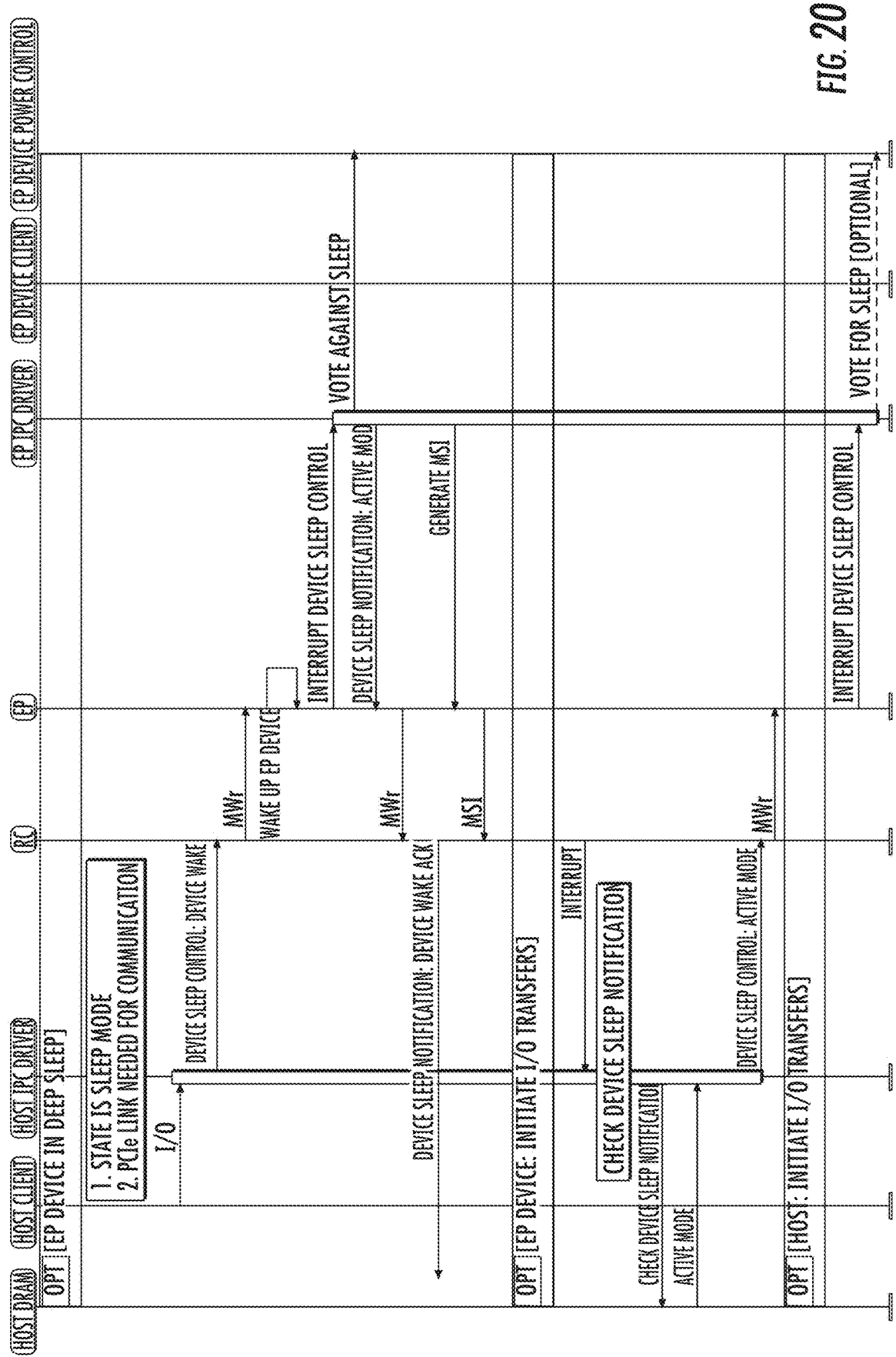
FIG. 20 is a software ladder diagram illustrating transactions for in-band device wake operations, in accordance with one implementation of the present disclosure.

FIGS. 19 and 20 are a software ladder diagrams illustrating transactions for exiting a sleep state according to out-of-band and in-band wake processes, respectively. As shown in FIG. 19, the EP processor's inter-processor link driver "votes" to exit sleep mode, and notifies the RC. Thereafter the RC verifies that the EP is active before initiating data transactions. As shown in FIG. 20, the host client initiates a downlink transfer and transfers to the Device_Wait state. Responsively, the EP processor's state machine exits sleep mode, and notifies the RC. Thereafter the RC verifies that the EP is active before initiating data transactions.

It will be recognized that while certain embodiments of the present disclosure are described in terms of a specific sequence of steps of a method, these descriptions are only illustrative of the broader methods described herein, and may be modified as required by the particular application.

Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A peripheral processor apparatus configured for data communication with a host processor apparatus, the peripheral processor apparatus being configured to utilize a shared memory interface to:
   determine a parameter indicating a condition for reduced-power operation of the peripheral processor apparatus, the determination of the parameter comprising a determination of at least one of (i) historic processing burden of the peripheral processor apparatus, or (ii) projected processing burden of the peripheral processor apparatus;
   determine whether a future activity associated with the peripheral processor apparatus may occur based at least on the host processor apparatus triggering a condition that maintains at least an operational state of the peripheral processor apparatus, the triggered condition being triggered based at least on a type of activity performed by the host processor apparatus; and
   enter the reduced-power operation based on the determined parameter and the determination of the future activity;
   wherein the peripheral processor apparatus comprises a baseband processor apparatus.

2. The peripheral processor apparatus of claim 1, wherein the determination of the parameter indicating the condition for the reduced-power operation further comprises a determination whether a processing load of the peripheral processor apparatus falls below a minimum threshold.

3. The peripheral processor apparatus of claim 1, wherein the condition that maintains at least the operational state of the peripheral processor apparatus comprises one or more of (i) a wake signaling from the host processor apparatus, (ii) a processing load of the peripheral processor apparatus, and (iii) a processing load of the host processor apparatus.

4. The peripheral processor apparatus of claim 1, wherein the peripheral processor apparatus is further configured to notify the host processor apparatus of the reduced-power operation.

5. The peripheral processor apparatus of claim 4, wherein notification of the reduced-power operation comprises one or more of (i) a minimum sleep time, (ii) a maximum sleep time, and (iii) a state of the associated with a reduced-power operation from a plurality of available states.

6. The peripheral processor apparatus of claim 1, wherein the peripheral processor apparatus is further configured to cause the host processor apparatus to selectively buffer incoming data based on a priority associated with the incoming data.

7. The peripheral processor apparatus of claim 1, wherein the type of activity being performed by the host processor apparatus comprises a type of communicative activity being performed by the host processor apparatus.

8. A method of managing power by a first processor apparatus, the first processor apparatus being communicative with a second processor apparatus, the method comprising:
   detecting a condition for reduced-power operation of the first processor apparatus, the detecting of the condition being based at least on one or more of: (i) data indicative of historic processing load or (ii) data indicative of predicted load;
   determining that future activity of the first processor apparatus may occur based at least on the second processor apparatus triggering a condition that maintains an active operation state of the first processor apparatus, the triggered condition being detected based at least on data indicative of a type of activity being performed by the second processor apparatus; and
   entering the reduced-power operation based on the determined parameter and absence of the determined future activity;
   wherein the first processor apparatus comprises a baseband apparatus.

9. The method of claim 8, wherein the detecting of the condition for the active operation state comprises determining whether a processing load of the first processor apparatus falls below a minimum threshold.

10. The method of claim 8, wherein the triggering of the condition that maintains the active operation state comprises detecting one or more of (i) a wake signaling from the second processor apparatus, (ii) a processing load of the first processor apparatus, and (iii) a processing load of the second processor apparatus.

11. The method of claim 8, wherein the maintenance of the active operational state comprises prevention of the reduced-power operation, the method further comprising notifying the second processor apparatus of the reduced-power operation.

12. The method of claim 11, wherein the notifying of the reduced-power operation comprises transmitting information related to one or more of (i) a minimum sleep time, (ii) a maximum sleep time, and (iii) a state of the reduced-power operation from a plurality of available states.

13. The method of claim 8, further comprising causing the second processor apparatus to selectively buffer incoming data based on an urgency associated with the incoming data.

14. The method of claim 8, wherein the type of activity being performed by the second processor apparatus comprises a type of communicative activity being performed by the second processor apparatus.

15. An apparatus comprising:
   a host processor apparatus and a peripheral processor apparatus, the peripheral processor apparatus comprising a baseband modem configured to perform one or more wireless modem functionalities;
   wherein the host processor apparatus and the peripheral processor apparatus are configured to perform data communication with each other via an inter-processor communication link; and
   wherein the peripheral processor apparatus is further configured to:
      determine a condition for reduced-power operation of the peripheral processor apparatus based at least on prior processing burden of the peripheral processor apparatus or anticipated processing burden of the peripheral processor apparatus;

detect a condition that enables maintenance of an active operation of the peripheral processor apparatus, the detection being based at least on activity type data corresponding to the host processor apparatus; and enter the reduced-power operation based on the determined condition for reduced-power operation and the detected condition.

16. The apparatus of claim 15, wherein the host processor apparatus comprises an applications processor (AP).

17. The apparatus of claim 15, wherein the determination of the condition for the reduced-power operation comprises a determination whether a processing load of the peripheral processor apparatus falls below a minimum threshold.

18. The apparatus of claim 15, wherein the condition that enables maintenance of the active operation comprises one or more of (i) a wake signaling from the host processor apparatus, (ii) a processing load of the peripheral processor apparatus, and (iii) a processing load of the host processor apparatus.

19. The apparatus of claim 15, wherein the peripheral processor apparatus is further configured to cause the host processor apparatus to selectively buffer incoming data based on an urgency associated with the incoming data.

20. The apparatus of claim 15, wherein the detection of the condition comprises determination of a likelihood of future activity of the peripheral processor apparatus based on the host processor apparatus triggering the condition that enables maintenance of the active operation, and an activity indicated by the activity type data comprises an activity by the host processor apparatus that is indicative of a request or a transmission of data wirelessly.

21. The peripheral processor apparatus of claim 1, wherein the determination of the future activity associated with the peripheral processor apparatus that may occur comprises a determination of a probability of the future activity.

22. The peripheral processor apparatus of claim 1, wherein:

the peripheral processor apparatus is further configured for data communication with the host processor apparatus via an inter-processor communication (IPC) link;

the peripheral processor apparatus is further configured for data communication via at least one wireless modem functionality; and each of the peripheral processor apparatus and the host processor apparatus is configured to be operative in a portable wireless-enabled client apparatus.

23. The method of claim 8, wherein:

each of the first processor apparatus is communicative with the second processor apparatus via implementation in a portable electronic apparatus; and the future activity of the first processor apparatus comprises wireless data traffic.

* * * * *